United States Patent
Collarte Bondy et al.

(10) Patent No.: US 11,422,238 B2
(45) Date of Patent: Aug. 23, 2022

(54) OPTICAL BEAM DIRECTOR

(71) Applicant: Baraja Pty Ltd., Lindfield West (AU)

(72) Inventors: Federico Collarte Bondy, Lindfield West (AU); Cibby Pulikkaseril, Lindfield West (AU); Rebecca Lodin, Lindfield West (AU); Andrea Tabacchini, Lindfield West (AU)

(73) Assignee: Baraja Pty Ltd., North Ryde (AU)

( * ) Notice: Subject to any disclaimer, the term of this patent is extended or adjusted under 35 U.S.C. 154(b) by 480 days.

(21) Appl. No.: 16/461,769

(22) PCT Filed: Nov. 15, 2017

(86) PCT No.: PCT/AU2017/051255
§ 371 (c)(1),
(2) Date: May 16, 2019

(87) PCT Pub. No.: WO2018/090085
PCT Pub. Date: May 24, 2018

(65) Prior Publication Data
US 2019/0361097 A1    Nov. 28, 2019

(30) Foreign Application Priority Data

Nov. 16, 2016   (AU) ................................ 2016904674
Jun. 16, 2017   (AU) ................................ 2017902306

(51) Int. Cl.
*G01S 7/481*   (2006.01)
*G02B 5/04*    (2006.01)
(Continued)

(52) U.S. Cl.
CPC .............. *G01S 7/4817* (2013.01); *G02B 5/04* (2013.01); *G02B 5/10* (2013.01); *G02B 5/1828* (2013.01)

(58) Field of Classification Search
CPC ...... G01S 7/4817; G01S 7/4814; G01S 17/08; G02B 5/04; G02B 5/10; G02B 5/1828;
(Continued)

(56) References Cited

U.S. PATENT DOCUMENTS

| 3,825,340 A | 7/1974 | Debart |
| 3,953,667 A | 4/1976 | Layton et al. |

(Continued)

FOREIGN PATENT DOCUMENTS

| CN | 103081261 B | 3/2016 |
| CN | 105705964 A | 6/2016 |

(Continued)

OTHER PUBLICATIONS

"Australian Application No. 2020203638, Examination Report No. 1 dated Jun. 2, 2021", (Jun. 2, 2021), 5 pgs.

(Continued)

*Primary Examiner* — Kimberly N. Kakalec
(74) *Attorney, Agent, or Firm* — Schwegman Lundberg & Woessner, P.A.

(57) ABSTRACT

Described herein is a system for directing light over two dimensions. The system includes a dispersive element arranged to direct light over an initial dimension based on wavelength. The system also includes an array of steering elements arranged along the initial dimension to receive the directed light, the array of steering elements configured to further direct the received light to whereby direction of the light over two dimensions is achieved. Also described is a method for directing light over two dimensions.

14 Claims, 13 Drawing Sheets

(51) Int. Cl.
*G02B 5/10* (2006.01)
*G02B 5/18* (2006.01)

(58) Field of Classification Search
CPC .............. G02B 27/1086; G02B 27/126; G02B 26/106; G02B 26/0808; G02B 27/1006; G02B 27/143; G02B 27/4244; G02F 1/29
See application file for complete search history.

(56) References Cited

U.S. PATENT DOCUMENTS

| | | | |
|---|---|---|---|
| 5,583,683 | A | 12/1996 | Scobey |
| 5,694,130 | A | 12/1997 | Suzuki et al. |
| 5,877,851 | A | 3/1999 | Stann et al. |
| 6,031,658 | A | 2/2000 | Riza |
| 6,147,760 | A | 11/2000 | Geng |
| 6,236,666 | B1 | 5/2001 | Mirov et al. |
| 6,263,127 | B1 | 7/2001 | Dragone et al. |
| 6,339,661 | B1 | 1/2002 | Kokkelink et al. |
| 6,359,681 | B1 | 3/2002 | Housand et al. |
| 6,377,720 | B1 | 4/2002 | Kokkelink |
| 6,687,036 | B2 | 2/2004 | Riza |
| 7,016,098 | B2 | 3/2006 | Giles et al. |
| 7,397,980 | B2 | 7/2008 | Frisken |
| 7,532,311 | B2 | 5/2009 | Henderson et al. |
| 7,804,056 | B2 | 9/2010 | Bishop |
| 7,916,278 | B2 | 3/2011 | Smith |
| 7,986,397 | B1 | 7/2011 | Tiemann et al. |
| 8,072,582 | B2 | 12/2011 | Meneely |
| 8,159,680 | B2 | 4/2012 | Robinson et al. |
| 8,179,594 | B1 | 5/2012 | Tidwell et al. |
| 8,440,952 | B2 | 5/2013 | Jalali et al. |
| 8,559,015 | B2 | 10/2013 | Kuramoto |
| 8,701,482 | B2 | 4/2014 | Tsadka et al. |
| 9,103,992 | B1 | 8/2015 | Day |
| 9,246,589 | B2 | 1/2016 | Koonen et al. |
| 9,435,957 | B1 | 9/2016 | Zhong et al. |
| 9,684,076 | B1 | 6/2017 | Feldkhun |
| 10,527,727 | B2 | 1/2020 | Bondy et al. |
| 2002/0126945 | A1 | 9/2002 | Konishi et al. |
| 2003/0043058 | A1 | 3/2003 | Jamieson et al. |
| 2003/0043363 | A1 | 3/2003 | Jamieson et al. |
| 2003/0161047 | A1 | 8/2003 | Lee et al. |
| 2003/0223748 | A1 | 12/2003 | Stowe et al. |
| 2004/0086214 | A1 | 5/2004 | Huang et al. |
| 2004/0135716 | A1 | 7/2004 | Wootton |
| 2005/0213877 | A1 | 9/2005 | Wu et al. |
| 2006/0124838 | A1 | 6/2006 | Baker et al. |
| 2007/0177841 | A1 | 8/2007 | Danziger |
| 2007/0272841 | A1 | 11/2007 | Wiklof |
| 2009/0002680 | A1 | 1/2009 | Ruff et al. |
| 2011/0106324 | A1 | 5/2011 | Tsadka et al. |
| 2011/0199621 | A1 | 8/2011 | Robinson et al. |
| 2011/0222574 | A1 | 9/2011 | Chann et al. |
| 2012/0001981 | A1 | 1/2012 | Wu et al. |
| 2013/0166113 | A1 | 6/2013 | Dakin et al. |
| 2013/0242400 | A1 | 9/2013 | Chen |
| 2014/0233013 | A1 | 8/2014 | Sakimura et al. |
| 2015/0086198 | A1 | 3/2015 | Frisken et al. |
| 2015/0160340 | A1 | 6/2015 | Grauer et al. |
| 2015/0192677 | A1 | 7/2015 | Yu et al. |
| 2015/0226853 | A1 | 8/2015 | Seo et al. |
| 2017/0090031 | A1 | 3/2017 | Bondy et al. |
| 2018/0031680 | A1 | 2/2018 | Lee et al. |
| 2020/0081128 | A1 | 3/2020 | Bondy et al. |

FOREIGN PATENT DOCUMENTS

| | | |
|---|---|---|
| DE | 4427352 | 1/1996 |
| EP | 0164181 | 12/1985 |
| EP | 0811855 | 12/1997 |
| EP | 1052868 A2 | 11/2000 |
| EP | 1065551 A2 | 1/2001 |
| EP | 2212717 | 8/2010 |
| EP | 2866051 A1 | 4/2015 |
| EP | 3081956 A1 | 10/2016 |
| JP | 08-189965 A | 7/1996 |
| JP | 2000347065 A | 12/2000 |
| JP | 2010-04881 A | 3/2010 |
| JP | 2011-021930 A | 2/2011 |
| JP | 2011-099756 A | 5/2011 |
| JP | 2012-154863 A | 8/2012 |
| JP | 2013-160769 A | 8/2013 |
| WO | WO-2009046717 | 4/2009 |
| WO | WO-2011036553 | 3/2011 |
| WO | WO-2011/112367 A1 | 9/2011 |
| WO | WO-2012/112683 A2 | 8/2012 |
| WO | WO-2013/119858 A1 | 8/2013 |
| WO | WO-2015018836 | 2/2015 |
| WO | WO-2015/059244 A1 | 4/2015 |
| WO | WO-2016075140 A1 | 5/2016 |
| WO | WO-2016097409 A2 | 6/2016 |
| WO | WO-2017054036 A1 | 4/2017 |
| WO | WO-2018090085 A1 | 5/2018 |

OTHER PUBLICATIONS

"Australian Application No. 2021202660, Examination Report No. 1 dated Jun. 24, 2021", (Jun. 24, 2021), 5 pgs.
"Australian Application No. 2021202661, Examination Report No. 1 dated Jun. 24, 2021", (Jun. 24, 2021), 6 pgs.
"Australian Application No. 2021202664, Examination Report No. 1 dated Jun. 24, 2021", (Jun. 24, 2021), 6 pgs.
"Australian Application No. 2021202666, Examination Report No. 1 dated Jun. 24, 2021", (Jun. 24, 2021), 5 pgs.
"Chinese Application No. 201780070963.0, Office Action", (dated Sep. 15, 2021), 8 pgs.
"Japanese Application No. 2019-525995, Notice of Reasons for Refusal", (dated Sep. 7, 2021), 9 pgs.
"International Application No. PCT/AU2017/051255, International Preliminary Report on Patentability completed Feb. 18, 2019", (Feb. 18, 2019), 25 pgs.
"International Application No. PCT/AU2017/051255, International Search Report and Written Opinion dated Jan. 19, 2018", (Jan. 19, 2018), 17 pgs.
"European Application Serial No. 17871153.7, Supplementary European Search Report dated May 29, 2020", 7 pgs.
"U.S. Appl. No. 15/277,235, Corrected Notice of Allowability dated Oct. 16, 2019", 2 pgs.
"U.S. Appl. No. 15/277,235, Notice of Allowance dated Aug. 22, 2019", 8 pgs.
"Australian Application Serial No. 2016333145, Examination Report dated Jan. 28, 2020", 2 pgs.
"Australian Application Serial No. 2016333145, Response filed Feb. 21, 20 to Examination Report dated Jan. 28, 2020", 13 pgs.
"European Application Serial No. 16849943.2, Office Action dated Apr. 9, 2020", 6 pgs.
"U.S. Appl. No. 15/277,235, Response to Restriction Requirement dated Jan. 29, 2019 filed Mar. 6, 2019", 9 pgs.
"U.S. Appl. No. 15/277,235, Restriction Requirement dated Jan. 29, 2019", 5 pgs.
"Australian Application No. 2016904674, International-type search for provisional patent application dated Dec. 14, 2016", (Dec. 14, 2016), 10 pgs.
"European Application No. 16849943.2, Extended European Search Report dated Apr. 4, 2019", (Apr. 4, 2019), 8 pgs.
Dieckmann, A., "FMCW-LIDAR with tunable twin-guide laser diode", Electronics Letters, vol. 30, No. 4, Feb. 17, 1994, (Feb. 17, 1994), 308-309.
Gao, Shuang, et al., "Complex-optical-field lidar system for range and vector velocity measurement", Optics Express, vol. 20, No. 23, Nov. 5, 2012, (Nov. 5, 2012), 25867-25875.
Pierrottet, Diego, et al., "Linear FMCW Laser Radar for Precision Range and Vector Velocity Measurements", Paper, Hampton, Virginia (2008), (2008), 9 pgs.
Quack, Niels, et al., "Development of an FMCW LADAR Source Chip using MEMS-Electronic-Photonic Heterogeneous Integration", University of California, Berkeley; University of Illinois at Urbana-Champaign (2014), (2014), 4 pgs.

(56) References Cited

OTHER PUBLICATIONS

Tsai, Jui-Che, et al., "1 x N 2 wavelength-selective switch with two cross-scanning one-axis analog micromirror arrays in a 4-f optical system", Journal of Lightwave Technology, vol. 24, No. 2, 2006, pp. 897-903, (Feb. 2006), 897-903.

Tsai, Jui-Che, et al., "High fill-factor two-axis analog micromirror array for 1XN2 wavelength-selective switches", Micro Electro Mechanical Systems, 2004, 17th IEEE International Conference on MEMS, IEEE, 2004, pp. 101-104, (2004), 101-104.

Watanabe, Toshio, et al., "Low-loss wavelength routing optical switch consisting of small matrix switch and cyclic arrayed-waveguide gratings for colorless add/drop", Japanese Journal of Applied Physics 53, 08MB02 (2014), (Jul. 2, 2014), 5 pgs.

Wu, Ming C., et al., "Optical MEMS for lightwave communication", Journal of Lightwave Technology, vol. 24, No. 12, 2006, pp. 4433-4454, (Dec. 2006), 4433-4454.

"Australian Application Serial No. 2016333145, Notice of Acceptance dated Mar. 20, 2020", 3 pgs.

"Australian Application Serial No. 2017361118, Examination Report No. 1 dated Feb. 12, 2021", 8 pgs.

"European Application Serial No. 16849943.2, Response filed Aug. 7, 2020 to Office Action dated Apr. 9, 2020", 21 pgs.

"European Application Serial No. 17871153.7, Office Action dated Jun. 17, 2020", 1 pg.

"European Application Serial No. 17871153.7, Response filed Dec. 17, 2020 to Office Action dated Jun. 17, 2020", 14 pgs.

"Japanese Application Serial No. 2018-515111, Office Action dated Jan. 5, 2021", (w/ English Translation), 6 pgs.

"Japanese Application Serial No. 2018-515111, Office Action dated Jul. 31, 2020", (w/ English Translation), 14 pgs.

"Japanese Application Serial No. 2018-515111, Written Argument and Amendment filed Nov. 9, 2020 to Office Action dated Jul. 31, 2020", (w/ English Translation), 25 pgs.

"Japanese Application Serial No. 2018-515111, Written Opinion filed Apr. 20, 2021 in response to Office Action dated Jan. 5, 2021", (w/ English Translation), 17 pgs.

Amann, M. C., et al., "Phase noise limited resolution of coherent LIDAR using widely tunable laser diodes", *Electronics Letters*, 28(18), (1992), 1694-1696.

Amoruso, S., et al., "Development of a tunable IR lidar system", *Optics and Lasers in Engineering*, 37(5)., (May 2002), 521-532.

"Japanese Application 2019-525995, Notice of Reasons for Refusal dated Feb. 1, 2022", (Feb. 1, 2022), 4 pgs.

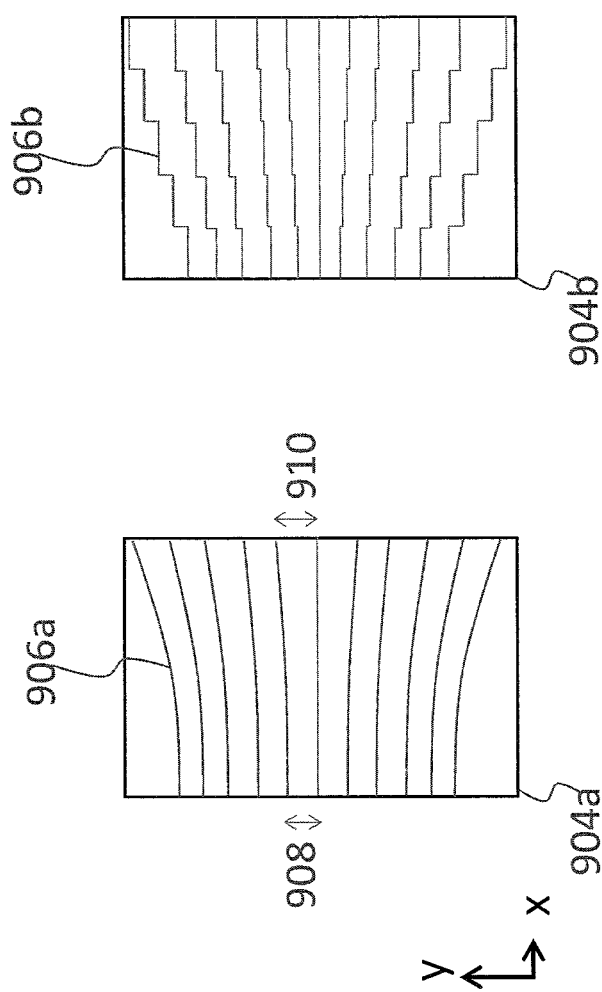

OPTICAL BEAM DIRECTOR

PRIORITY CLAIM TO RELATED APPLICATIONS

This application is a U.S. national stage filing under 35 U.S.C. § 371 from International Application No. PCT/AU2017/051255, filed on 15 Nov. 2017, and published as WO2018/090085 on 24 May 2018, which claims the benefit under 35 U.S.C. 119 to Australia Application No. 2016904674, filed on 16 Nov. 2016, and which claims the benefit under 35 U.S.C. 119 to Australia Application No. 2017902306, filed on 16 Jun. 2017, the benefit of priority of each of which is claimed herein, and which applications and publication are hereby incorporated herein by reference in their entirety.

FIELD OF THE DISCLOSURE

The present disclosure generally relates to a system and method for directing an optical beam. More particularly, the present disclosure relates to a system and method for directing an optical beam in two dimensions.

BACKGROUND OF THE DISCLOSURE

Optical beam direction has several uses, including but not limited to LiDAR (light detection and ranging) applications, in which light is sent into an environment for mapping purposes. In three-dimensional mapping, one of the dimensions relates to the range of a point from the origin of the optical beam, whereas the other two dimensions relate to two dimensional space (e.g. in Cartesian (x, y) or polar (r, theta) coordinates) in which the optical beam is steered across.

SUMMARY OF THE DISCLOSURE

According to one aspect of the disclosure, there is provided an optical system for directing light over two dimensions, the light including a selected one of multiple wavelength channels grouped into wavelength bands, the system including:

a dispersive element arranged to direct the light towards one of first directions over an initial dimension based on the selected one of the multiple wavelength channels; and an array of steering elements arranged along the initial dimension to receive the directed light, the array of steering elements configured to further direct the received light towards one of second directions based on its position along the initial dimension, the second directions aligned along respective planes based on the respective wavelength bands, the planes being distributed over a first dimension associated with the initial dimension, each plane extending across a second dimension substantially perpendicular to the first dimension.

According to another aspect of the disclosure, there is provided a method of directing light over two dimensions, the light including a selected one of multiple wavelength channels grouped into wavelength bands, the method including:

directing the light, using a dispersive element, towards one of first directions over an initial dimension at an array of steering elements arranged along the initial dimension based on the selected one of the multiple wavelength channels; and further directing the directed light, using the array of steering elements, towards one of second directions based on position along the initial dimension, the second directions aligned along respective planes based on the respective wavelength bands, the planes being distributed over a first dimension associated with the initial dimension, each plane extending across a second dimension substantially perpendicular to the first dimension.

According to another aspect of the disclosure, there is provided an optical system for directing light over two dimensions, the optical system including:

at least one dispersive element arranged to receive light comprising at least one of multiple wavelengths and spatially disperse the multiple wavelengths;

a first steering element arranged to receive, from the dispersive element, a first plurality of the multiple wavelengths, less than all of the multiple wavelengths, and spatially direct the first plurality of the multiple wavelengths across a first projection; and a second steering element arranged to receive, from the dispersive element, a second plurality of the multiple wavelengths, less than all of the multiple wavelengths and different from the first plurality of the multiple wavelengths, and spatially direct the second plurality of the multiple wavelengths across a second projection;

wherein in combination the first projection and the second projection extend over two dimensions.

According to another aspect of the disclosure, there is provided a method for directing light over two dimensions, the method including:

receiving, at a first steering element, a first light signal including a first range of wavelengths and spatially directing, by the first steering element, the first light signal across a first projection;

receiving, at a second steering element, a second light signal including a second range of wavelengths, different from the first range of wavelengths, and spatially direct, by the second steering element, the second light signal across a second projection;

wherein in combination the first projection and the second projection extend over two dimensions.

Further aspects of the present disclosure and further embodiments of the aspects described in the preceding paragraphs will become apparent from the following description, given by way of example and with reference to the accompanying drawings.

BRIEF DESCRIPTION OF THE DRAWINGS

FIGS. 9A and 9B illustrate different arrangements of a variable line-spacing grating.

DETAILED DESCRIPTION OF EMBODIMENTS

Described herein is an optical system for directing light over two dimensions. The described system is capable of steering light based on one or more selected wavelength channels and without mechanically moving parts. While description herein focuses on a single selected wavelength channel (e.g. using a single wavelength-tunable light source), it should be appreciated that the description also applies to, with minor modifications, multiple selected wavelength channels (e.g. using a multi-colour light source or combining multiple single-wavelength tunable light sources). Steerability in terms of scanning speed, directional stability and spatial resolution therefore depends on the wavelength-tuning speed, wavelength stability and wavelength-resolution, respectively. The described system can be useful in reducing dependence on mechanical performance, such as reducing occurrences or impact of mechanical failure or mechanical fatigue, due to its static nature.

The described system can be used a beam director, for example, in a spatial profiling arrangement for estimating the spatial profile of an environment. Other example applications for beam direction include spectrometry, optical line-of-sight communications, 2D scanning on manufacturing lines, projectors, 2D printers, adaptive illumination and so on. While the following description focusses on spatial profile estimation, a person skilled in the art would appreciate that the description is, with minor modification, also applicable to the other beam direction applications.

Figure 1:
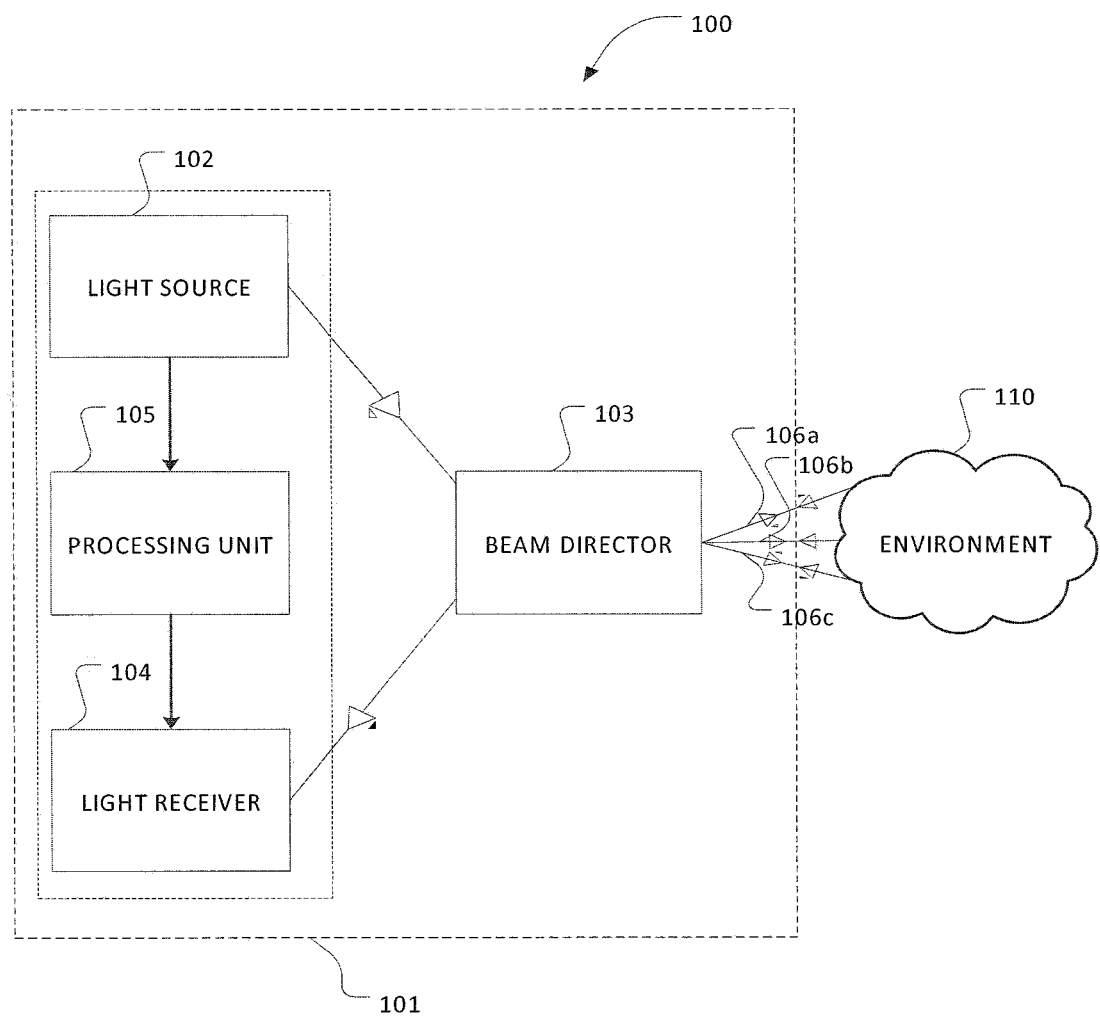
FIG. 1 illustrates a module for spatially profiling an environment.

FIG. 1 illustrates an example of a spatial profiling arrangement 100. The arrangement 100A includes a light source 102, a beam director 103, a light receiver 104 and a processing unit 105. In the arrangement of FIG. 1, outgoing light from the light source 102 is directed by the beam director 103 in a direction in two dimensions into an environment 110 having a spatial profile. If the outgoing light hits an object or a reflecting surface, at least part of the outgoing light may be reflected (represented in solid arrows), e.g. scattered, by the object or reflecting surface back to the beam director 103 and received at the light receiver 104. The processing unit 105 is operatively coupled to the light source 102 for controlling its operations. The processing unit 105 is also operatively coupled to the light receiver 104 for determining the distance to the reflecting surface, by determining the round-trip distance travelled by the reflected light.

The light source 102, the beam director 103, the light receiver 104 may be optically coupled to one another via free-space optics, and/or optical waveguides such as optical fibres or optical circuits in the form of 2D or 3D waveguides. Outgoing light from the light source 102 is provided to the beam director 103 for directing into the environment. Any reflected light collected by the beam director 103 may be directed to the light receiver 104. In one example, light from the light source 102 is also provided to the light receiver 104 for optical processing purposes via a direct light path (not shown) from the light source 102 to the light receiver 104. For example, the light from the light source 102 may first enter a sampler (e.g. a 90/10 fibre-optic coupler), where a majority portion (e.g. 90%) of the light is provided to the beam director 103 and the remaining sample portion (e.g. 10%) of the light is provided to the light receiver 104 via the direct path. In another example, the light from the light source 102 may first enter an input port of an optical switch and exit from one of two output ports, where one output port directs the light to the beam director 103 and the other output port re-directs the light to the light receiver 104 at a time determined by the processing unit 105.

The light from the light source 102 includes a selected one of N wavelength channels grouped into M wavelength bands. The light source 102 may be a wavelength-tunable laser, allowing selection of the desired wavelength channel via an electronic control signal. The M wavelength bands may include consecutive wavelength channels. For example, the N wavelength channels are designated by their centre wavelengths $\lambda_1, \lambda_2, \ldots \lambda_N$, and the M wavelength bands are $\{\lambda_1, \lambda_2, \ldots, \lambda_k\}, \{\lambda_{k+1}, \lambda_{k+2}, \ldots \lambda_{2k}\}, \ldots \{\lambda_{N-k+1}, \lambda_{N-k+2}, \ldots \lambda_N\}$ where $k=N/M$.

First Arrangements

Figure 2:
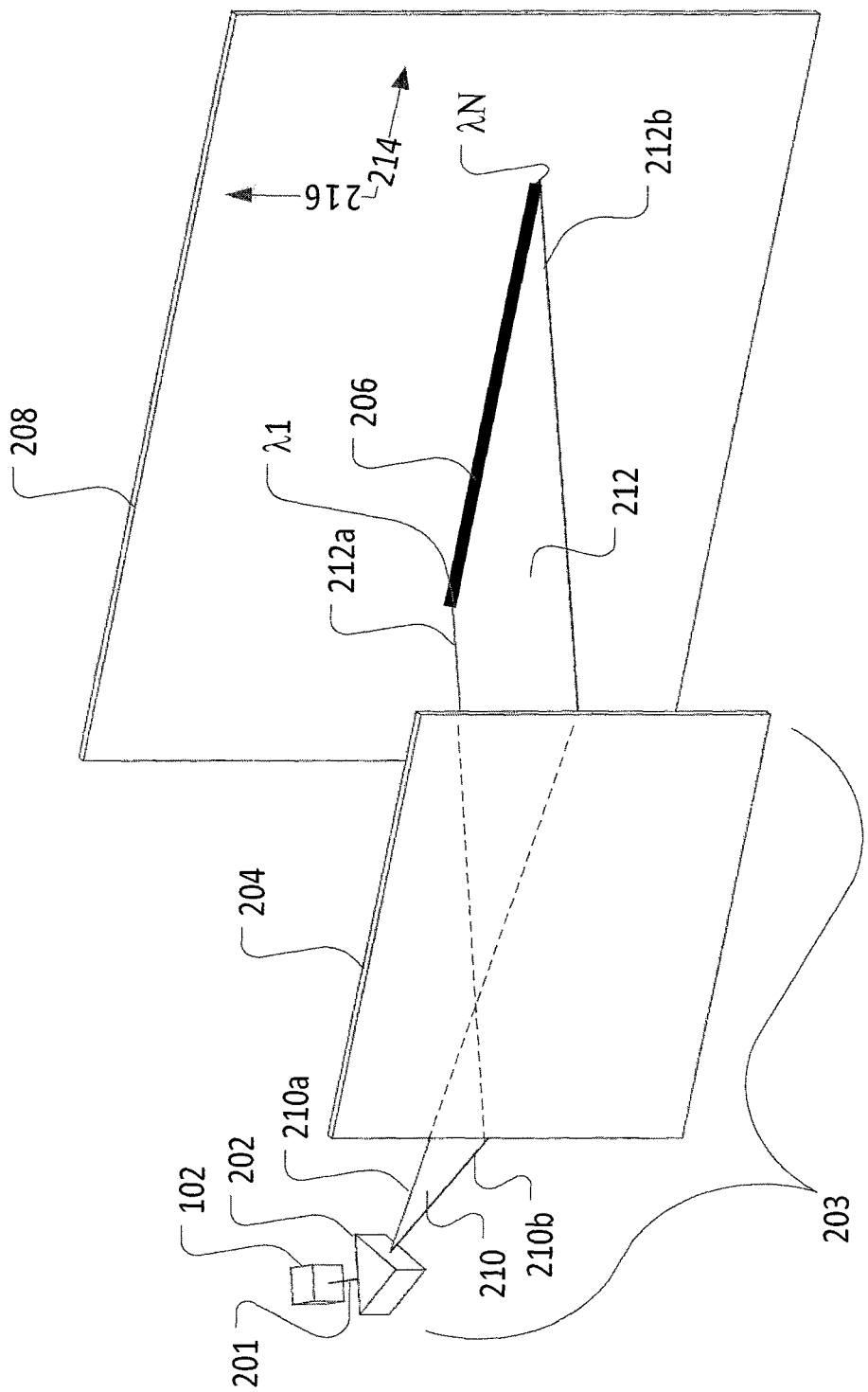
FIG. 2 illustrates schematically an arrangement of system for directing an optical beam.
Figure 3A:
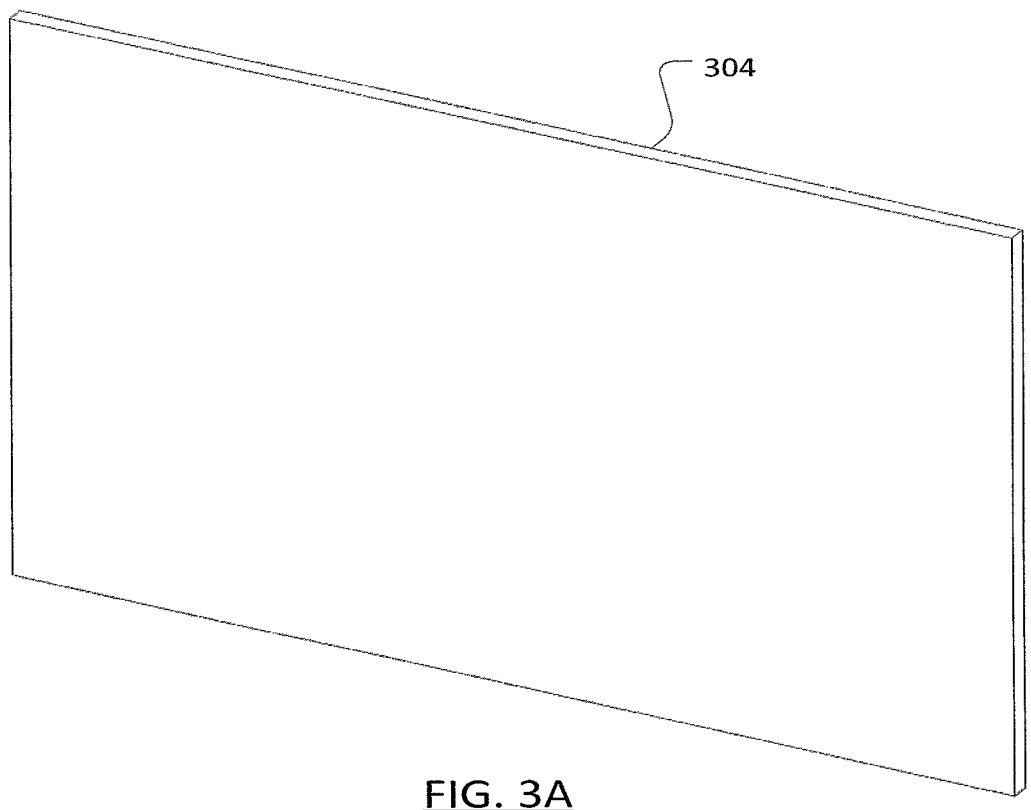
FIGS. 3A and 3B illustrate schematically an arrangement of the optical beam director and spatial distribution of the optical beam over swept wavelength channels.
Figure 3B:
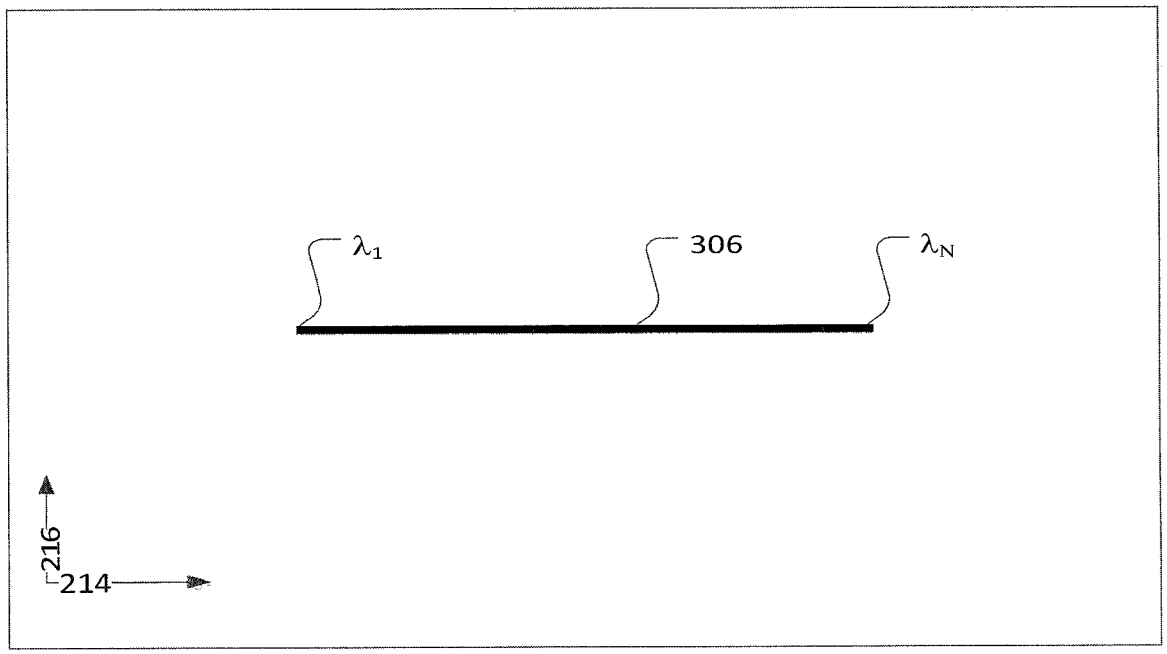

Referring to FIG. 2, the described system 203 plays the role of the beam director 103 in FIG. 1. The described system 203 includes a dispersive element 202 arranged to direct the light 201 from the light source 102 over an initial dimension (which can be a linear or a non-linear dimension). The dispersive element 202 may be one or more gratings and/or one or more prisms. Although the initial dimension illustrated in FIG. 2 appears as a continuous plane between light path 210a (e.g. corresponding to wavelength channel $\lambda_1$) and light path 210b (e.g. corresponding to wavelength channel $\lambda_N$), the system 203 in practice generally accepts a selected one of wavelength channel $\lambda_1, \lambda_2, \ldots \lambda_N$ at any one time based on the selected one of the multiple wavelength channels.

The described system 203 includes an array of reflective elements (collectively labelled as 204 in FIG. 2) arranged along the initial dimension to receive the directed light 210. For illustrative purposes, a screen 208 which is not part of the described system 203 is illustrated in FIG. 2 to depict the spatial distribution of the directed optical beam 212 when the selected wavelength is swept between $\lambda_1$ and $\lambda_N$. As illustrated in FIG. 2, where the reflective elements 204 take the form of a single plane mirror, the light path 210a of the directed light 210 is reflected along the light path 212b of reflected light 212. Similarly, the light path 210b of the directed light 210 is reflected along the light path 212a of reflected light 212. In the case of a single plane mirror, the image 206 is in the form of a continuous line. Again, since the system 203 in practice generally accepts a selected one of wavelength channel $\lambda_1, \lambda_2, \ldots \lambda_N$ at any one time, the image 206 in practice forms a point rather than a continuous line as it is depicted in FIG. 2 for illustrative purposes. The spatial distribution of the directed optical beam 206 is along a first dimension 214, associated with the initial dimension caused by the dispersive element 202. The directed optical beam 206 is not distributed along a second dimension 216 substantially orthogonal to the first dimension 214.

FIGS. 3 to 7 illustrate the consequence of adopting different arrays of reflective elements. FIGS. 3A and 3B reproduce the case of the single plan mirror of FIG. 2 for comparison purposes. Where the reflective elements 204 are a single plane mirror 304, the image 206 is in the form of a continuous line 306 where the selected wavelength is swept between $\lambda_1$ and $\lambda_N$. The spatial distribution of the directed optical beam 212 is along a first dimension 214, associated with the initial dimension caused by the dispersive element 202. The directed optical beam 206 is not distributed along the second dimension 216.

Figure 4A:
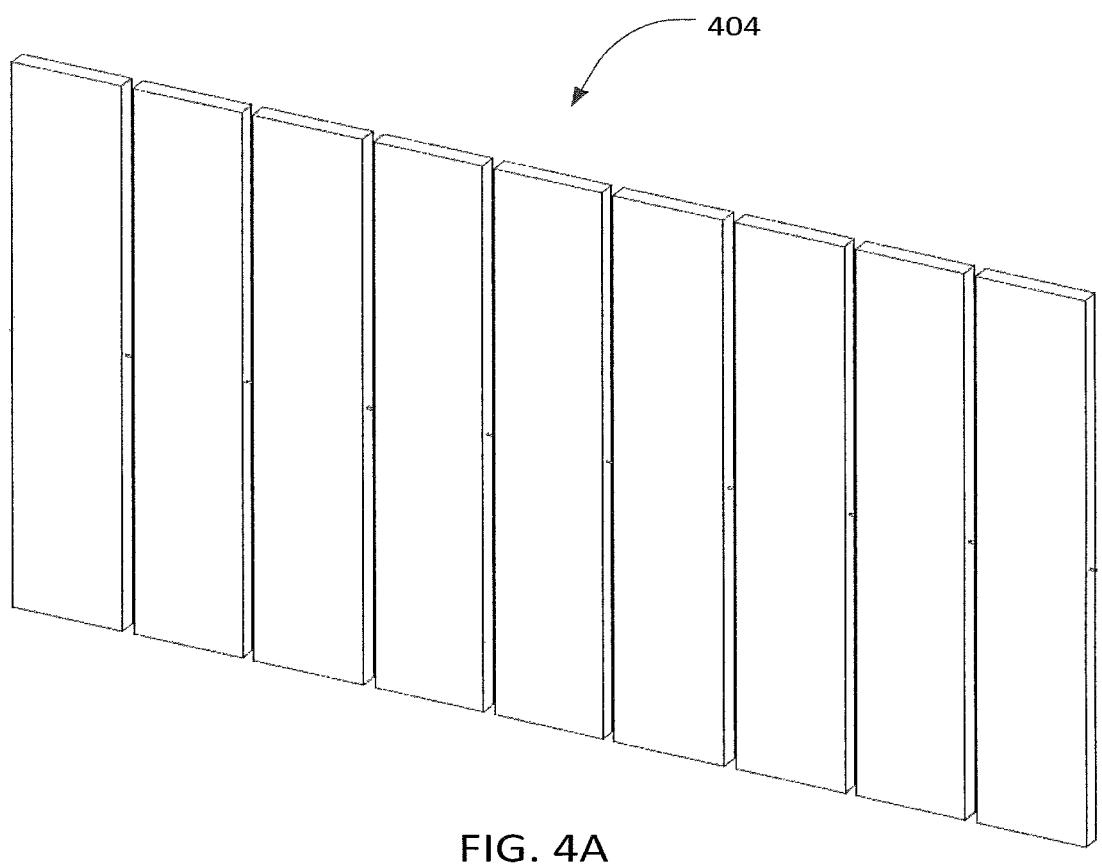
FIGS. 4A and 4B illustrate schematically another arrangement of the optical beam director and spatial distribution of the optical beam over swept wavelength channels.
Figure 4B:
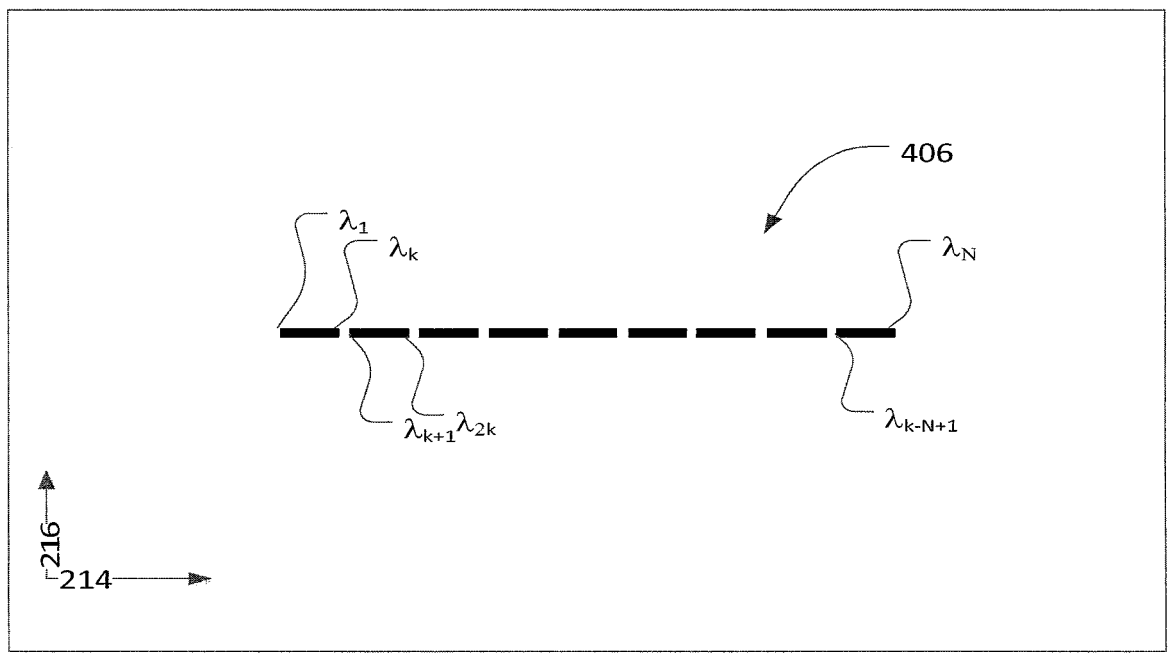

FIGS. 4A and 4B represent the case where the reflective elements 204 are an array of single plane mirrors 404 each separated from adjacent mirrors by a small gap. The image 206 is in the form of a broken line 406 where the selected wavelength is swept between $\lambda_1$ and $\lambda_N$. Each broken section of the broken line represents a wavelength sweep across a band of wavelength channels (e.g. $\{\lambda_1, \lambda_2, \ldots \lambda_k\}$, $\{\lambda_{k+1}, \lambda_{k+2} \ldots \lambda_{2k}\}, \ldots$ or $\{\lambda_{N-k+1}, \lambda_{N-k+2}, \ldots \lambda_N\}$). In this case, the spatial distribution of the directed optical beam 212 is still along a first dimension 214, associated with the initial dimension caused by the dispersive element 202. The directed optical beam 206 is not distributed along the second dimension 216.

Figure 5A:
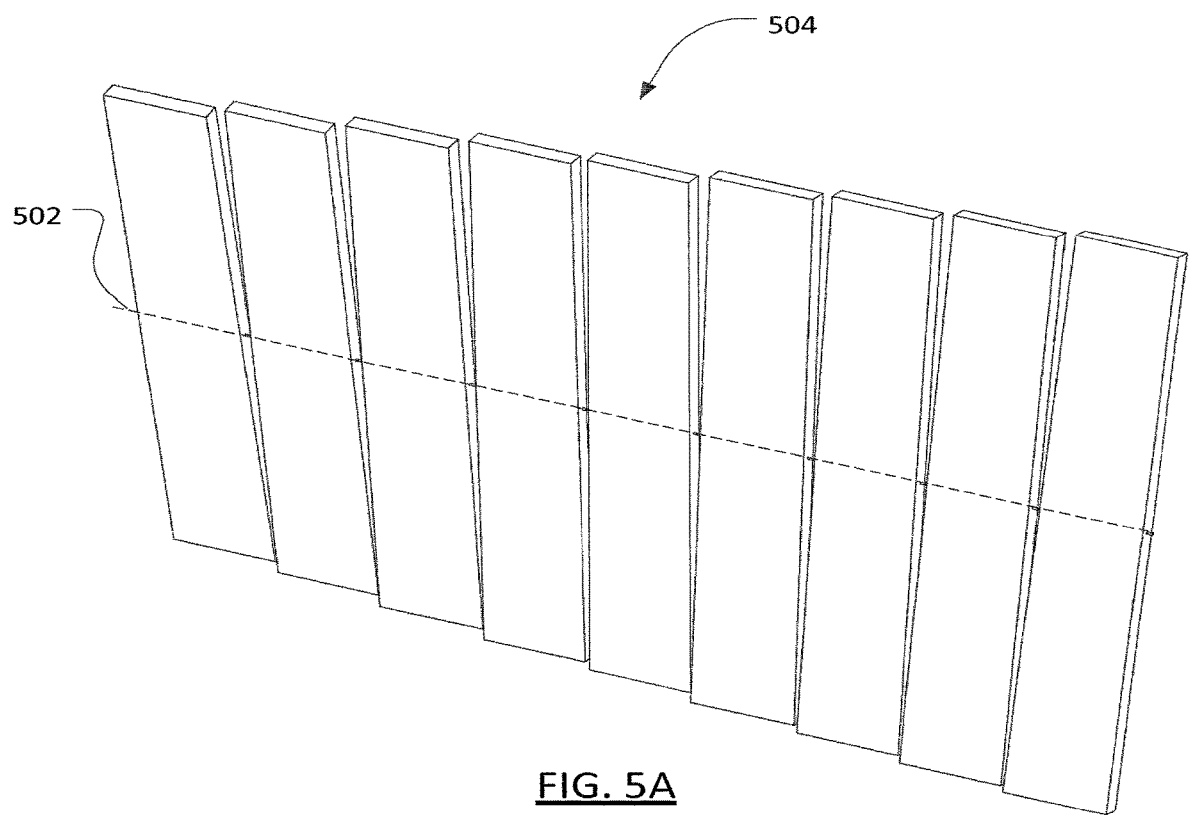
FIGS. 5A and 5B illustrate schematically yet another arrangement of the optical beam director and spatial distribution of the optical beam over swept wavelength channels.
Figure 5B:
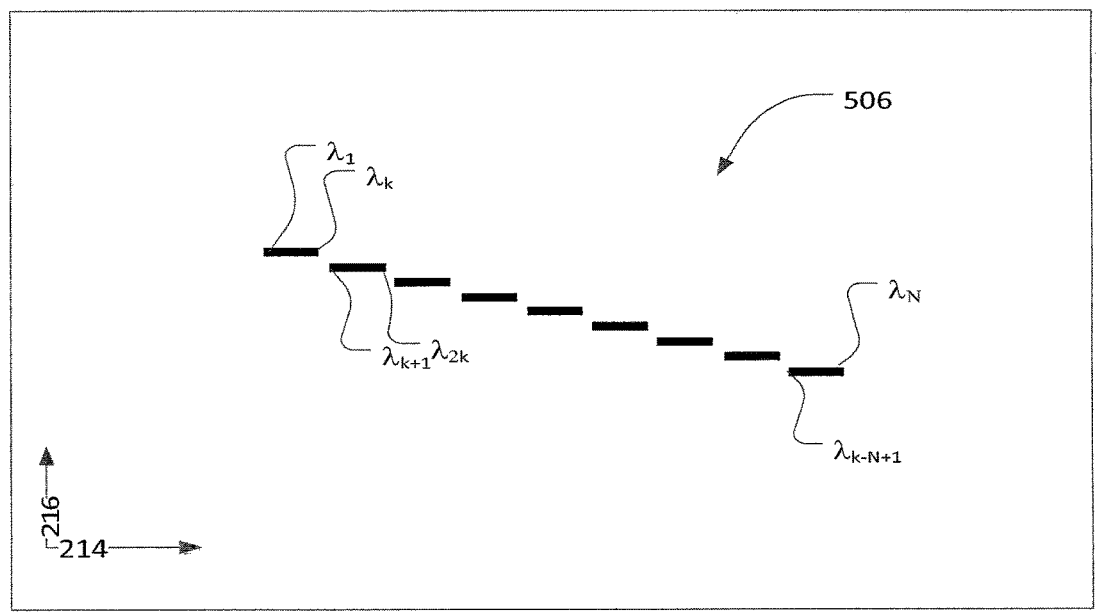

FIGS. 5A and 5B represent the arrangement of the described system 203 where the reflective elements 204 are an array of plane mirrors 504, each separated from adjacent mirrors by a small gap, and tilted or otherwise angularly offset from one another about a straight line axis 502 extending along the first dimension 214 through each of the plane mirrors. The image 206 is in the form of stepped lines 506 where the selected wavelength is swept between $\lambda_1$ and $\lambda_N$. Each step represents a wavelength sweep across a band of wavelength channels (e.g. $\{\lambda_1, \lambda_2, \ldots \lambda_k\}$, $\{\lambda_{k+1}, \lambda_{k+2} \ldots \lambda_{2k}\}, \ldots$ or $\{\lambda_{N-k+1}, \lambda_{N-k+2}, \ldots \lambda_N\}$). The effects of the angular offset is to reflect the received light 212 towards different substantially planar surfaces (or "planes" herein) distributed over the second dimension 216, where each plane extends across the first dimension 214. The directed optical beam 206 is distributed along both the first dimension 214 and the second dimension 216. The extents of the different planes however do not overlap in the first dimension 214. Although not shown, the different planes can be configured to at least partially overlap if the plane mirrors 504 are further tilted or otherwise further angularly from one another about an axis which is orthogonal to the axis 502 and extending along the second dimension 216. An effect of this orthogonal tilting on the image 206 is to translate the stepped lines 506 along the first dimension 214. An appropriate amount of orthogonal tilting for each plane mirror 504 would translate the stepped lines to be fully overlapped with one another, forming a two dimensional steering grid.

Figure 6A:
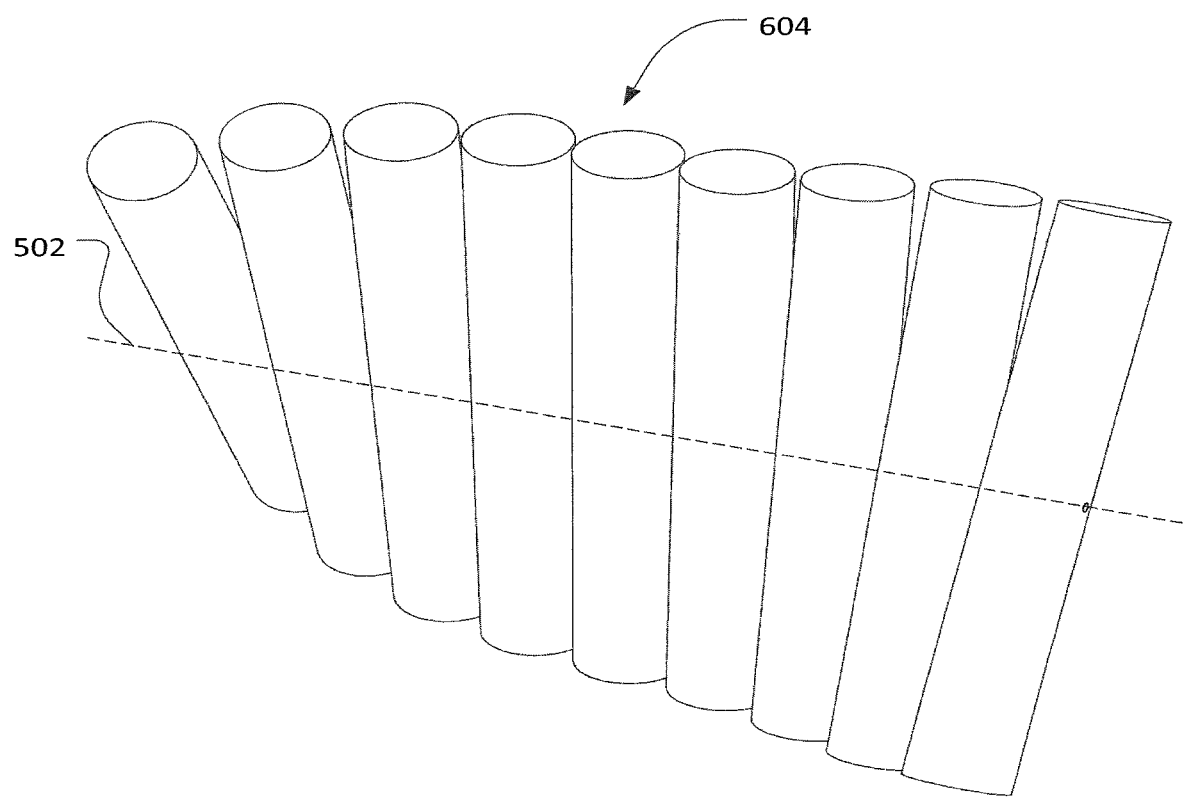
FIGS. 6A and 6B illustrate schematically still yet another arrangement of the optical beam director and spatial distribution of the optical beam over swept wavelength channels.
Figure 6B:
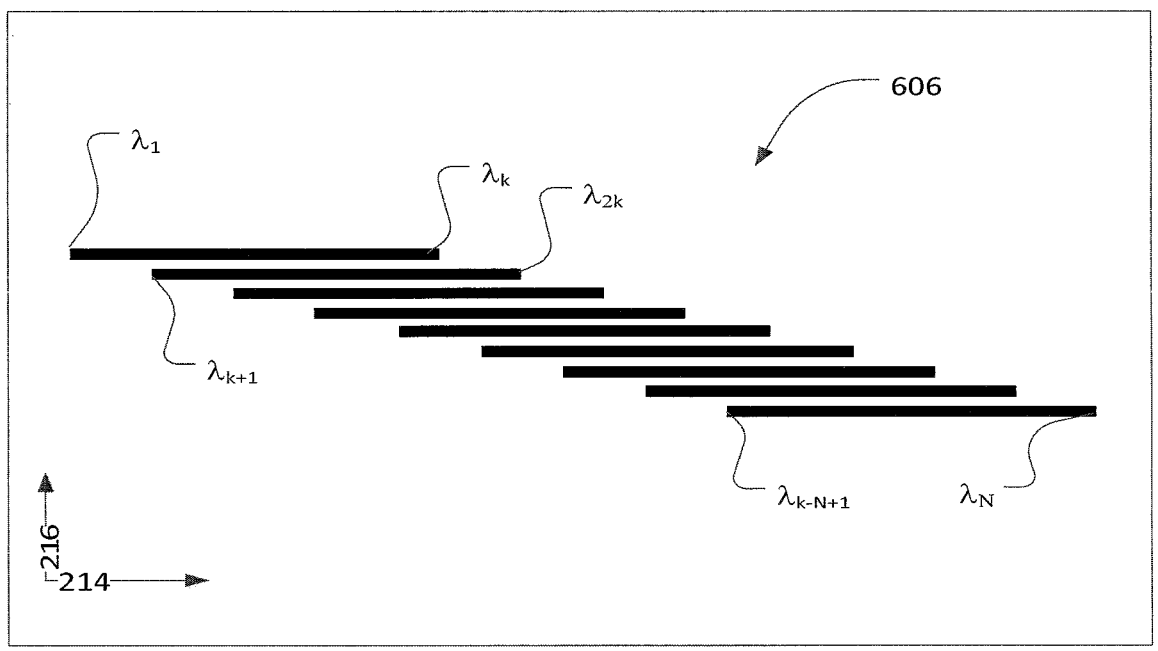

FIGS. 6A and 6B represent the arrangement of the described system 203 where the reflective elements 204 are an array of diverging mirrors 504 (such as in the form of reflective cylinders or convex surfaces), each separated from adjacent mirrors by a small gap, and tilted or otherwise angularly offset from one another about a straight line axis 602 through the centre of each of the diverging mirrors. The image 206 is in the form of stepped lines 606 where the selected wavelength is swept between $\lambda_1$ and $\lambda_N$. Each step represents a wavelength sweep across a band of wavelength channels (e.g. $\{\lambda_1, \lambda_2, \ldots \lambda_k\}$, $\{\lambda_{k+1}, \lambda_{k+2} \ldots \lambda_{2k}\}, \ldots$ or $\{\lambda_{N-k+1}, \lambda_{N-k-2}, \ldots \lambda_N\}$). As with the case illustrated in FIGS. 5A and 5B, the effects of the angular offset is to reflect the received light 212 towards different planes distributed over the second dimension 216, where each plane extends across the first dimension 214. The use of the diverging mirrors is to extend the extents of each plane in the first dimension 214, which can be controlled by using diverging mirrors of different curvature. In general, a greater curvature of the diverging mirrors leads to a greater extent of the planes extending along the first dimension 214. The directed optical beam 206 is distributed along both the first dimension 214 and the second dimension 216.

Figure 7A:
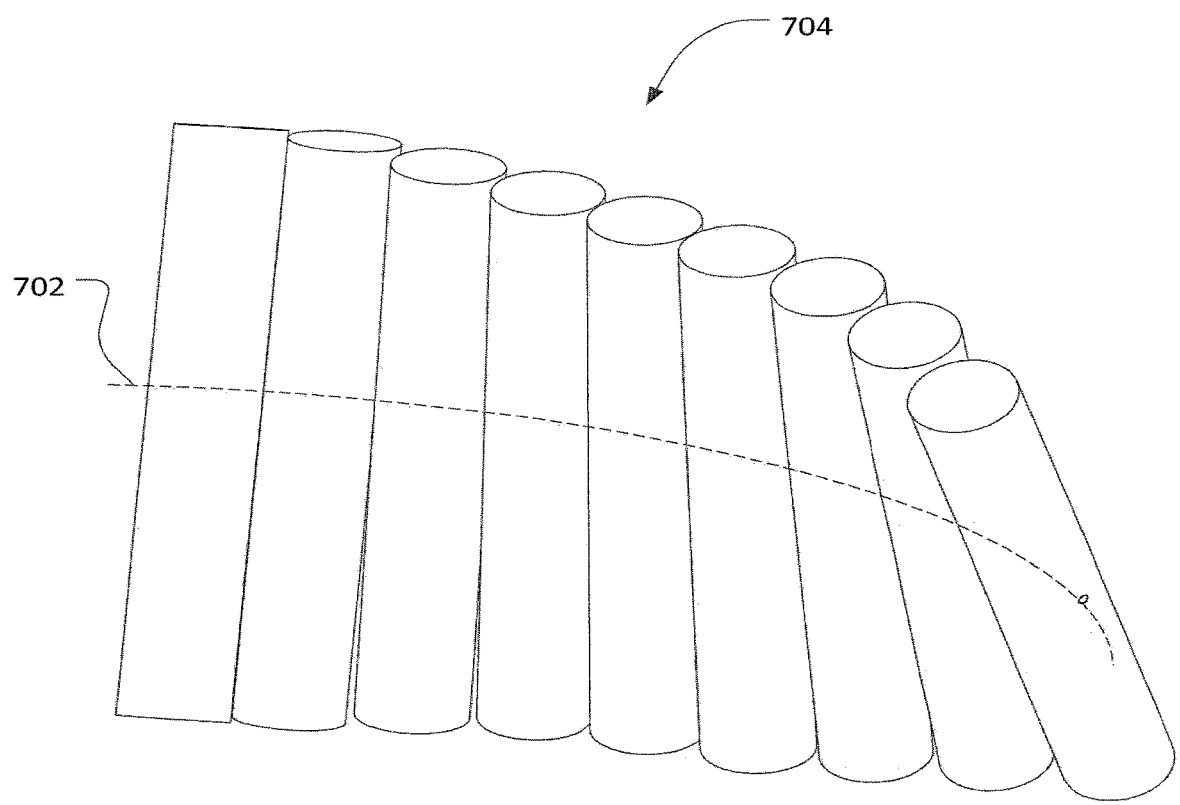
FIGS. 7A and 7B illustrate schematically a further arrangement of the optical beam director and spatial distribution of the optical beam over swept wavelength channels.
Figure 7B:
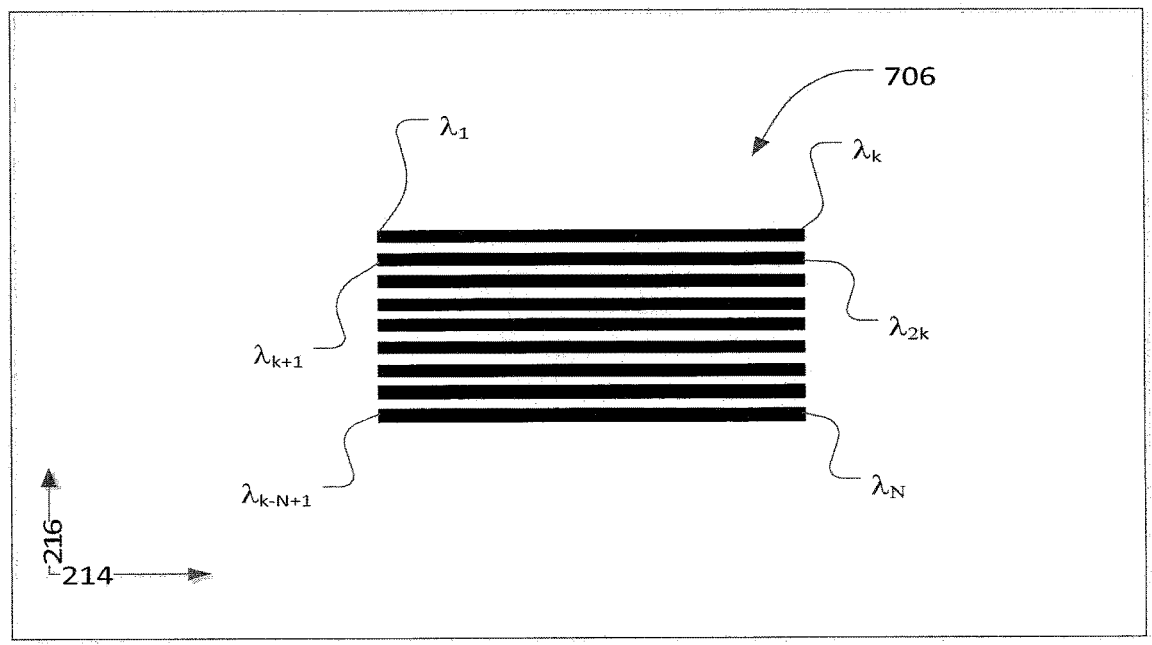

FIGS. 7A and 7B represent the arrangement of the described system 203 where the reflective elements 204 are an array of diverging mirrors 704 (such as in the form of reflective cylinders or convex surfaces), each separated from adjacent mirrors by a small gap, and tilted or otherwise angularly offset from one another, and arranged about a curved axis 702 through each of the reflective elements. The image 206 is in the form of stacked lines 706 where the selected wavelength is swept between $\lambda_1$ and $\lambda_N$. Each stack represents a wavelength sweep across a band of wavelength channels (e.g. $\{\lambda_1, \lambda_2, \ldots \lambda_k\}$, $\{\lambda_{k+1}, \lambda_{2k}\}, \ldots$ or $\{\lambda_{N-k+1}, \lambda_{N-k+2}, \ldots \lambda_N\}$). As with the case illustrated in FIGS. 5A and 5B, the effects of the angular offset is to reflect the received light 212 towards different planes distributed over the second dimension 216, where each plane extends across the first dimension 214. The angular offset may be tuned to adjust the separation of the stacks. The use of the diverging mirrors is to extend the extents of each plane in the first dimension 214, which can be controlled by using diverging mirrors of different curvature. In general, a greater curvature of the diverging mirrors leads to a greater extent of the planes extending along the first dimension 214. In one arrangement, the curved axis 702 follows a concave path in the initial dimension for equalising or aligning the extents of the first dimension 214 across the respective planes. In another arrangement, the curved axis can be parabolic. The curvature of curved axis 702 may be tuned to adjust the extents across the respective planes. The directed optical beam 206 is distributed along both the first dimension 214 and the second dimension 216.

Using the arrangement of FIG. 7A, the described system 203 can be configured to spatially direct the outgoing light into one of multiple directions (106a, 106b, 106c . . . ) in the two dimensions 214 and 216 into the environment 110. The direction into which the outgoing light is directed corresponds to, or is based on, the selected one of the multiple wavelength channels (centred at $\lambda_1, \lambda_2, \ldots \lambda_N$).

Example

In one configuration, a light source with multiple spectral components or with tuneable wavelength (e.g. tuneable laser C-Band 43 nm tuning range) is incident on or through a diffracting element, such as a prism or a compound prism, which translates a selection of wavelength channel into a one-dimensional angular dispersion. In this configuration, a prism providing 0.25°/nm angular dispersion translates the 43 nm spectral range into 10° of angular separation. The configuration includes a magnifying telescope (e.g. 15×) or convex mirror (e.g. half-circle) to magnify the angularly dispersed light. Using a 15× magnifying telescope, the angular dispersion is magnified to about 150°. The output of the angle magnifier is arranged to be located at the centre of curvature of a concave mirror, such that the output light is directed along the radii of the convex mirror. In this case the incident rays would be reflected along the same but opposite direction as they would be incident on the mirror surface as the direction of propagation is normal to the mirror surface.

In this configuration, assume that the radius of the convex mirror is 0.05 m, hence the arc covering the 150° illuminated by the incident light is 0.13 m=(0.05×π×150°/180°. In one example, this 0.13 m arc is divided into 50 sub-sections, each of which is configured to locate a half-circle convex mirror of 0.0013 m radius. The incident light on each of the 50 convex half-circles will subtend a 3° angle (i.e. 150°/50) but the small half-circles will have an angle magnification effect such that the light reflected of each sub-section will have angular dispersion of 3°×38.19=114.59, where the magnification of 38.19× results from the ratio of the radii (i.e. 0.05/0.0013=38.19×).

This configuration may then be arranged following FIG. 7A. Each of these small convex half-circles is constructed out of a tubular section. By tilting each tubular section by +0.5° in the Z-axis relative to the previous section so that the reflected light of each is projected on to a different z-axis angular dispersion (with 0.5° increments). The reflected light generates a 2D image based on the wavelength channel. In this example the 2D image includes 50 lines in the vertical with 0.5° resolution and vertical field of view of 25° (50×0.5°). Horizontally the example configuration covers 114.59° with the resolution limited by the smallest change in wavelength of the light source.

Based on the foregoing, there is provided an optical system for directing light over two dimensions. The light includes a selected one of multiple wavelength channels grouped into wavelength bands. The system includes a dispersive element arranged to direct the light over an initial dimension based on the selected one of the multiple wavelength channels, and an array of reflective elements arranged along the initial dimension to receive the directed light, the reflective elements arranged to reflect the received light towards respective planes based on the respective wavelength bands, each respective plane extending across a first dimension associated with the initial dimension, the respective planes distributed over a second dimension substantially perpendicular to the first dimension.

A corresponding method of directing light over two dimensions is also provided. The method includes directing the light, using a dispersive element, over an initial dimension at an array of reflective elements arranged along the initial dimension based on the selected one of the multiple wavelength channels, and reflecting the directed light, using the array of reflective elements, towards respective planes based on the respective wavelength bands, each respective plane extending across a first dimension associated with the initial dimension, the respective planes distributed over a second dimension substantially perpendicular to the first dimension.

Second Arrangements

Figure 8:
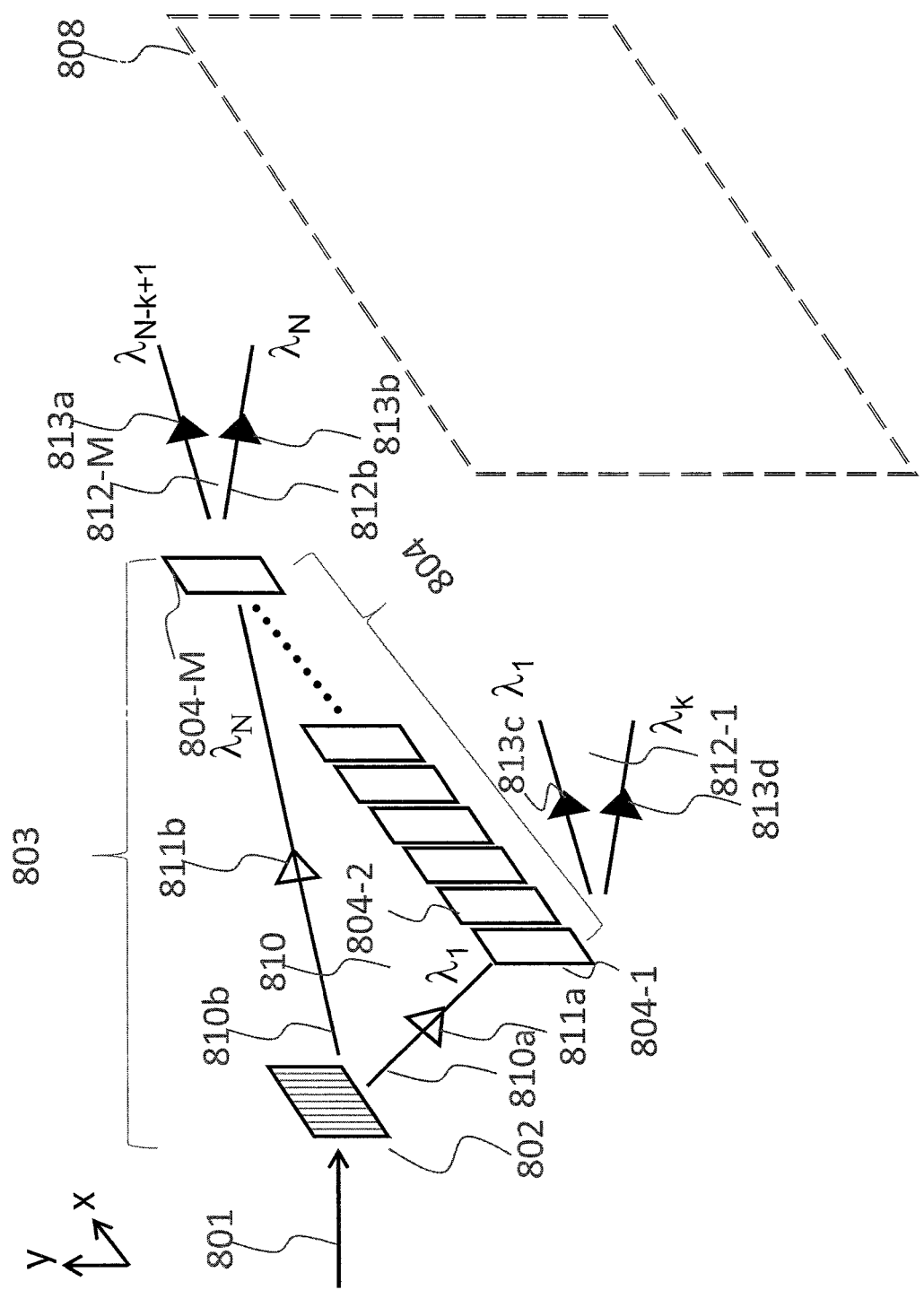
FIG. 8 illustrates schematically an arrangement of a system for directing an optical beam.

Referring to FIG. 8, the described system 803 plays the role of the beam director 103 in FIG. 1. The described system 803 includes a first dispersive element 802 arranged to direct the light 801 from the light source 102 towards one of first directions over an initial dimension (e.g. along the x-axis in FIG. 8). Each of the first directions corresponds to a potential light path of the directed light 810, in turn corresponding to a wavelength channel. For example, as illustrated in FIG. 8, light path 810a corresponds to wavelength channel $\lambda_1$ and light path 810b corresponds to wavelength channel $\lambda_N$. Some of the first directions are represented in FIG. 8 as open triangles 811a and 811b. The first dispersive element 802 may be one or more diffraction gratings and/or one or more prisms. The angular spread of the directed light 810 depends on the range of the wavelength channels and the dispersive property of the dispersive element 802. In one non-limiting example for illustrative purposes, the light source 102 may include a telecommunications-grade laser. A telecommunications-grade laser may have a wavelength tuning range of up to 40 nm, such as from approximately 1527 nm to approximately 1567 nm. The dispersive element 802 may include a diffraction grating (such as a transmission grating) with uniform line spacing. In one variant, the diffraction grating may have a grating period between 1000 lines/mm and 1100 lines/mm, facilitating an angular spread of approximately 5-10 degrees. In another variant, the diffraction grating may have a grating period of about 600 lines/mm.

The described system 803 further includes an array of second dispersive elements 804-1 . . . 804-M (collectively referred to as 204) arranged along the initial dimension to receive the directed light 810. In this example, there are M second dispersive elements, corresponding to the M wavelength bands. The array of second dispersive elements is configured to further direct the received light towards one of second directions. Some but not all of the second directions are represented in FIG. 8 as closed triangles 813a, 813b, 813c and 813d. As illustrated in FIG. 8, the second directions are aligned along respective substantially planar surfaces (or "planes" herein) based on the respective wavelength bands. For example, light at the wavelength channels $\{\lambda_1, \lambda_2, \ldots \lambda_k\}$ directed towards dispersive element 804-1 is further directed by the array 804 (in particular dispersive element 804-1) towards directions aligned along the leftmost plane 812-1 corresponding to a first of the M wavelength bands. Similarly, although not shown, light at the wavelength channels $\{\lambda_{k+1}, \lambda_{k+2} \ldots \lambda_{2k}\}$ directed towards dispersive element 804-2 is further directed by the array 804 (in particular dispersive element 804-2) towards directions aligned along a plane corresponding to a second of the M wavelength bands, and so on, with light at the wavelength channels $\{\lambda_{N-k+1}, \lambda_{N-k+2}, \ldots \lambda_N\}$ directed towards dispersive element 804-M being directed by the array 804 (in particular dispersive element 804-M) towards directions aligned along the rightmost plane 812-M corresponding to an M-th of the M wavelength bands.

In practice, the system 803 does not result in a plane of light being directed as the output beam. Rather, one or a few beams of light, each associated with a corresponding centre wavelength, are directed as the output beam at any one time. The plane representation in FIG. 8 is depicted only for illustration purposes. That is, while directed light 810 depicted FIG. 8 appears as a continuous plane in the initial dimension between light path 810a (e.g. corresponding to wavelength channel $\lambda_1$) and light path 810b (e.g. corresponding to wavelength channel $\lambda_N$), and while further directed light 812 depicted in FIG. 8 appears as continuous planes 812-1, . . . 812-M, the system 803 generally accepts a selected one of wavelength channel $\lambda_1, \lambda_2, \ldots \lambda_N$ at any one time. Alternatively, the plane representation in FIG. 8 may be viewed as capturing a rapid wavelength scan from $\lambda_1$ to $\lambda_N$.

Further, while the system 803 is described using a single selected wavelength channel, a person skilled in the art would appreciate that the system may be adapted to accept a few selected ones of the wavelength channels simultaneously or nearly simultaneously. In one example, the light source 102 includes multiple wavelength-tunable lasers, each tuned to emit a different wavelength.

For illustrative purposes, a screen 808 which is not part of the described system 803 is depicted in FIG. 8 to depict the spatial distribution 1000 (see FIG. 10 and description below) of the output optical beam 812 when the selected wavelength is swept between $\lambda_1$ and $\lambda_N$. The array of second dispersive elements 804 is each configured to direct the received light towards the one of second directions depending on the position at which the light is incident within an individual second dispersive element 804. The array is depicted in FIG. 8 having separate dispersive elements 804 for illustration purposes. The dispersive elements 804 may or may not be separate by a gap with lines as illustrated.

In one arrangement, the array of second dispersive elements 804 each include a variable line-spacing grating (such as in transmission) to diffract the received light across a second dimension. The variable line-spacing grating includes multiple grating periods based on positions along the initial dimension (e.g. along the x-axis) on the variable line-spacing grating. In one arrangement, the variable line-spacing grating 904a has a shorter grating period 908 at a first edge and a longer grating period 910 at a second opposed edge. The grating period may increase from the first edge to the second edge. In one arrangement, variation in the multiple grating periods substantially repeats across the array 804 of second dispersive elements. In other words, the grating period may increase from the first edge to the second edge of each of the second dispersive elements.

FIGS. 9A and 9B illustrate two arrangements of a variable line-spacing grating. In the arrangement of FIG. 9A, the grating period varies from the first edge to the second edge (e.g. with line spacing 1060 lines/mm) continuously. The continuous variation in the multiple grating periods manifest in smooth grating lines 906a. In an example of this arrangement, the line spacing 908 at the first edge is 800 lines/mm while the line spacing 910 at the second edge is 1050 lines/mm. Even with no change in wavelength, such a range of line spacing is sufficient to cause a beam divergence of approximately 30 to 35 degrees. Other line spacing can be used. The array may be 40 mm in length. In this example, the width of each variable line-spacing grating (i.e. distance from the first edge to the second edge) may be 1 mm, thereby allowing about 40 dispersive elements in the array 804.

The length of the grating may be 20 mm, thereby allowing about at least 18,000 grating lines. In the arrangement of FIG. 9B, the grating period varies from the first edge to the second edge discretely. The discrete variation in the multiple grating periods manifest in stepped grating lines 906b. Note that for illustration purposes only, the steps along the x-axis are connected by lines along the y-axis, but in practice there may be no grating lines along the y-axis.

Where a continuously variable line-spacing grating is used, such as that illustrated in FIG. 9A, the system 903 may further include a focussing element (not shown) to confine (e.g. focus) the light received at the variable line-spacing grating in the initial dimension. The focussing action aims to keep the spatial extent of the light beam along the initial dimension to be sufficiently small to essentially see or illuminate an approximately uniformly spaced grating. In one example, the focussing element is a cylindrical lens curved in the initial dimension (i.e. along the x-axis). After the light is focussed by the focussing element and confined when received at the variable line-spacing grating, the light emerging from the variable line-spacing grating may diverge and require collimation. In one arrangement, the system 803 includes a collimating element for collimating the focussed light. While the system 803 may include further optical elements to shape, direct, filter or otherwise affect the collimated light, the collimated light is ultimately directed to the environment 110.

In an alternative arrangement, the second dispersive elements may each include a position-dependent reflective element, functioning as the variable line-spacing grating of FIG. 9A or 9B. In a first configuration, analogous to the discretely variable-line spacing grating in FIG. 9B, each dispersive element 804-X includes a set of reflective elements (e.g. plane mirrors or MEMs), each reflective element being positioned along the initial dimension and arranged to reflect light to a one respective of the second directions. For example, to provide this alternative arrangement, each portion of the discretely variable line-spacing grating in FIG. 9B as seen by the received light as having a local and uniform grating period may be replaced by a plane mirror angled to reflect light from the first dispersive element to a respective direction aligned along a corresponding plane among planes 812-1, 812-2 . . . 812-M, the respective direction being associated with a position of the respective plane mirror along the initial dimension. In a second configuration, analogous to the continuously variable line-spacing grating of FIG. 9A, the set of reflective elements of the first configuration can be formed integrally as a curved reflective surface. In other words, both configurations of this alternative arrangement achieve the same directional effect as the respective portion of the variable line-spacing grating. While strictly speaking the reflective elements alone in this alternative arrangement do not direct light based on wavelength, they achieve an overall dispersive effect of the second dispersive elements based on the collective effect of initial dispersion from the first dispersive element and spatially-dependent angle of reflection. In other words, even though an array of reflective elements are not dispersive by themselves, the reflective elements each receiving different wavelength channels and being angled differently to reflect received light are considered to achieve the function of a second dispersive element, as the reflective elements provide wavelength-addressable steering.

Figure 10A:
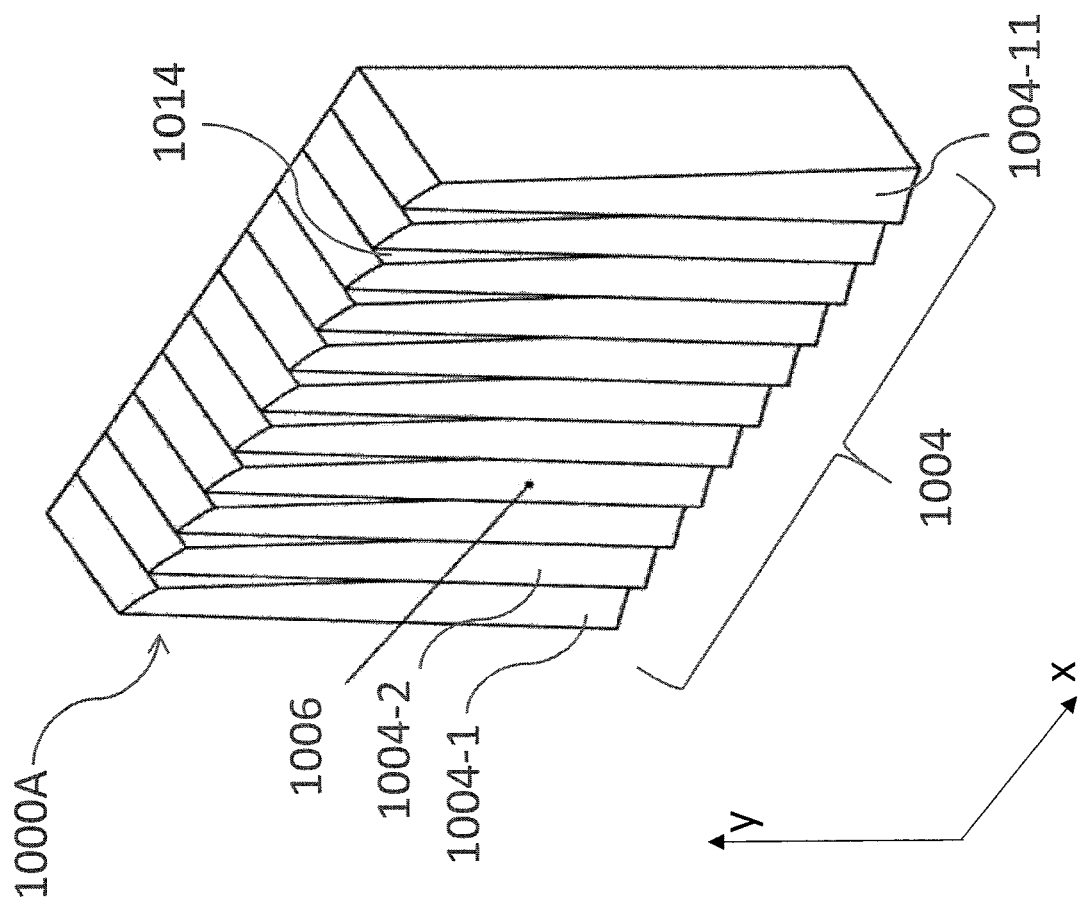
FIGS. 10A and 10B illustrate another arrangement of the array of second dispersive elements.
Figure 10B:
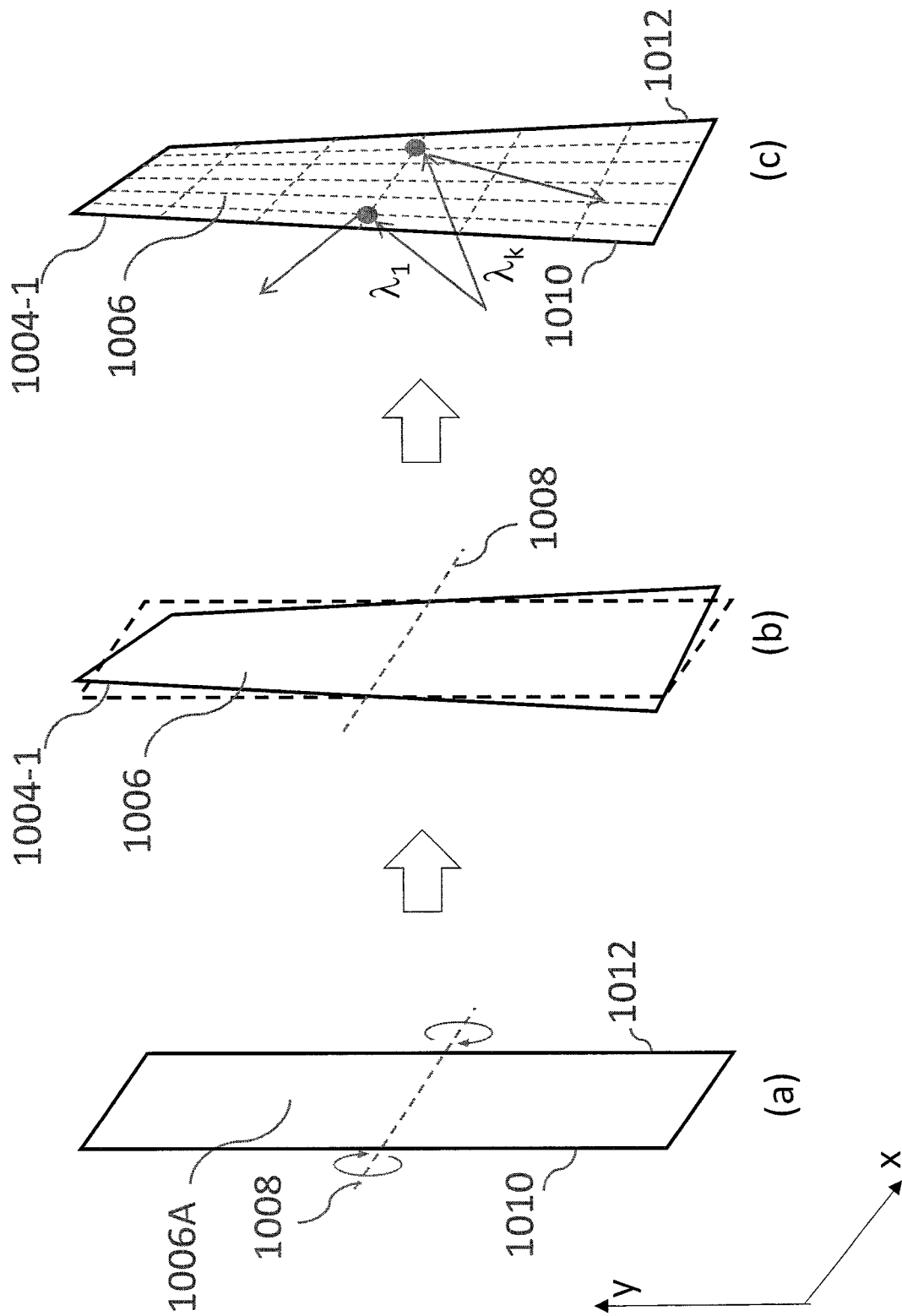
Figure 10C:
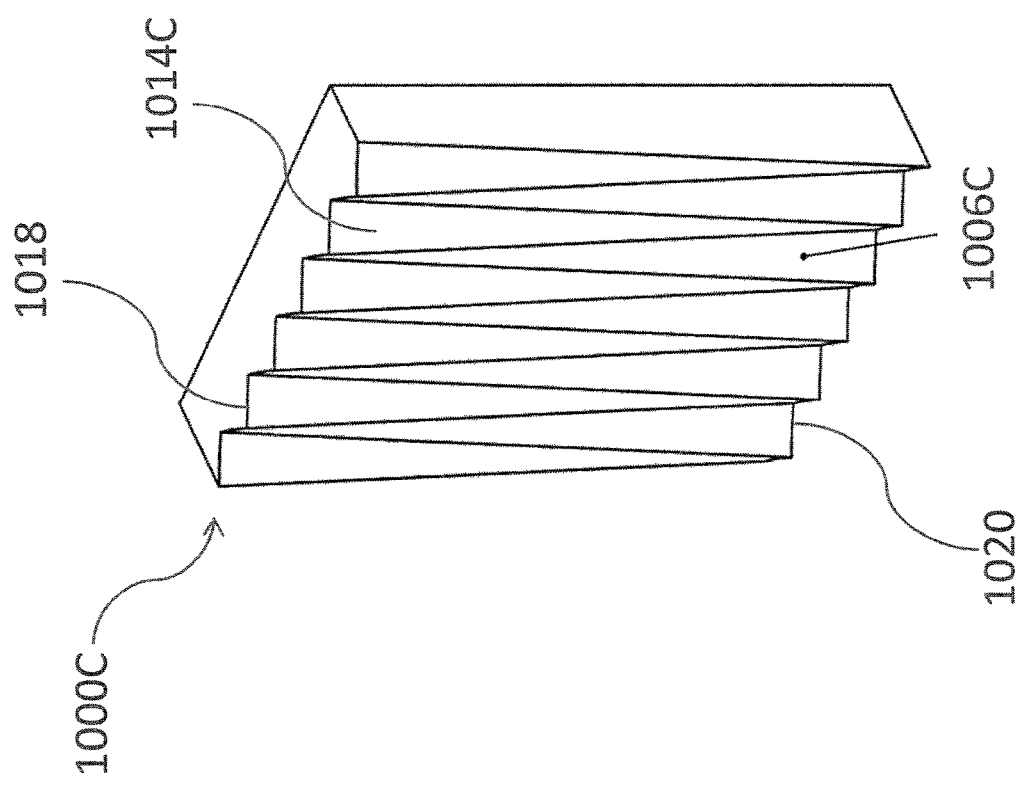
FIG. 10C illustrates yet another arrangement of the array of second dispersive elements.

FIG. 10A illustrates the second configuration 1000A of such an alternative arrangement. The configuration 1000A includes an array 1004 of second dispersive elements (1004-1, 1004-2, . . . 1004-11 in this illustration), each including a curved reflective surface 1006. As schematically depicted in FIG. 10B, the curved reflective surface 1006 of each second dispersive element (e.g. 1004-1) can be understood as being formed by "twisting" a flat surface 1006A in the x-y plane about an axis 1008 parallel to the x-axis. For example, referring to FIG. 10B(a) and (b), starting with the flat reflective surface 1006A, a first edge 1010 of the element 1004-1 is deformably rotated in one direction (e.g. clockwise) about the axis 1008 while a second and opposed edge 1012 of the element 1004-1 is deformably rotated in an opposite direction (e.g. anti-clockwise) about the axis 1008. In practice, the formation of the curved surface 1006 may not be via deformation, but by, for example high-precision milling followed by surface polishing and coating (e.g. with gold).

Referring to FIG. 10B(c) showing the resulting surface contour in dashed lines, light directed by the first dispersive element 802 and incident near the first edge 1010 ($\bullet_1$ in FIG. 10B(c)) is reflected towards one y-direction (e.g. positive y-direction), while light directed by the first dispersive element 802 and incident near the second edge 1012 ($\lambda_k$ in FIG. 10B) is reflected towards a different y-direction (e.g. negative y-direction). In other words, the normal vector of the reflective surface varies based on positions along the x-axis. The normal vector variation may be continuous or discrete with positions. Each additional second dispersive element 1004-X positioned along the x-axis is configured similarly with the first and second edges "twisted" in opposite directions, facilitating a raster beam steering as the wavelength changes. For example, light is swept from the positive y-direction to the negative y-direction as the light changes wavelength within a wavelength band $\lambda_1$ to $\lambda_k$ (i.e. when incident across one second dispersive element), and stepped along the x-axis as the light changes wavelength to a next wavelength band $\lambda_{k+1}$ to $\lambda_{2k}$ (i.e. when incident to the next second dispersive element), and so on. As mentioned, in one configuration, the curved surface 1006 of each second dispersive element 1004-X can be alternatively formed by a set of flat reflective elements, each incrementally angled to reflect light, for example, from the positive y-direction to the negative y-direction.

Figure 11:
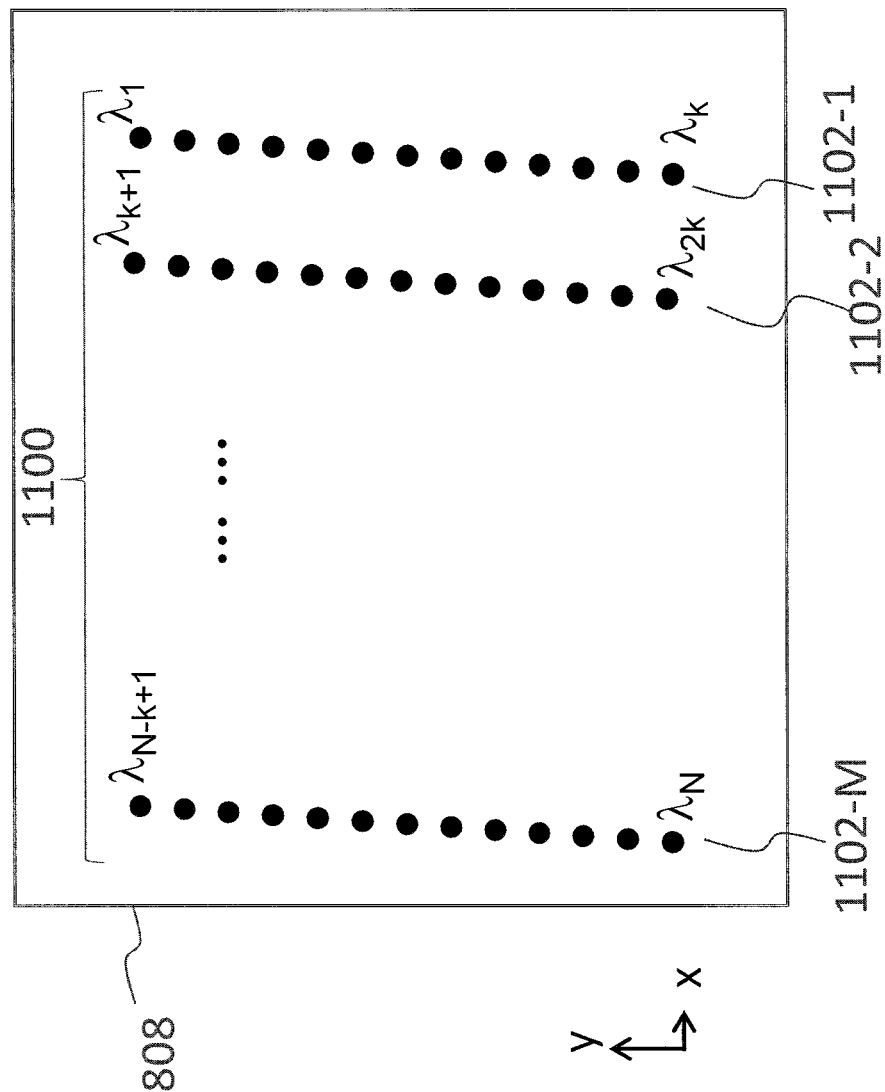
FIG. 11 illustrates schematically an image of intercepted output of the system of FIG. 8.

In the arrangement 1000A of FIG. 10A, an abrupt step exists at the boundary between adjacent dispersive elements 1004-X. Here, the abrupt step includes an adjoining surface 1014 that is orthogonal to the x-y plane, and that adjoins the curved surfaces 1006 of the adjacent dispersive elements 1004-X. In an alternative arrangement 1000C, illustrated in FIG. 10C, the abrupt steps manifest in a zig-zag fashion in the x-direction. Here, the adjoining surface 1014C is a mirror image of the curved surface 1006C that receives the incident light. Zig-zag patterns along the top end 1018 and the bottom end 1020 of the arrangement 1000C are inverted versions of each other. FIG. 11 illustrates schematically an image 1100 of a screen 808 located at the output of the system 803 to intercept the outgoing light. Each dot in FIG. 11 represents a selected one of the wavelength channels $\lambda_1$, $\lambda_2, \ldots \lambda_N$. Note that each dot in practice appears on its own based on the selected wavelength channel, but for illustration purposes all dots are depicted in FIG. 11 as if they could be captured at the same time. The image 1100 indicates M groups (1102-1, 1102-2 . . . 1102-M) of light output. The M groups of light output correspond to the M second dispersive elements (804-1 . . . M), the M wavelength bands and the M planes (812-1 . . . M). These planes are distributed over a first dimension, with each extending across a second dimension substantially perpendicular to the first dimension. The first dimension may not necessarily exactly coincide with the initial dimension (i.e. x-axis in FIG. 8), and the second dimension may not necessarily exactly coincide with dimension orthogonal to the initial dimension (i.e. y-axis in FIG. 8). As illustrated in FIG. 11, each group of light output is represented to be tilted at a small angle from the y-axis. The small angle tilt results from the small wavelength-dependent dispersion created by the first dispersive element 202 and required to illuminate different positions along the initial dimension of each second dispersive element to provide position-dependent dispersion in the second dimension. This tilt is in practice negligible and/or easily corrected or adapted, for example by physically adjusting the mounting angles so that the planes 812-1, 812-2 . . . 812-M align with the true vertical axis (i.e. the meridian) in the physical world frame.

Using the arrangement of FIG. 8, the described system 803 can be configured to spatially direct the outgoing light into one of multiple directions (106a, 106b, 106c . . . ) in the two dimensions 814 and 816 into the environment 110. The direction into which the outgoing light is directed corresponds to, or is based on, the selected one of the multiple wavelength channels (centred at $\lambda_1, \lambda_2, \ldots \lambda_N$).

General Arrangements

The foregoing disclosure describes arrangements including one or more of reflective, refractive and diffractive elements to facilitate wavelength-dependent two-dimensional steering of light. More generally, the steering can be achieved by directing light to different positions along one dimension based on a selected one of multiple wavelength channels, and further directing the light using one or more steering elements for steering light to different directions along another dimension based on the different positions. The wavelength-dependent direction may be achieved using, for example, a dispersive element such as any combination of one or more prisms, one or more gratings and one or more grisms. The steering elements exert a position-dependent directional influence via, for example, reflection, refraction or diffraction on the light. For example, in the arrangement of FIGS. 7A and 7B, the steering elements are an array of convex reflective surfaces, whose normal vector varies with position. As another example, in the arrangements of FIGS. 9A and 9B, the steering elements are an array of variable line-spacing gratings, whose grating period varies with position. As yet another example, in the arrangement of FIGS. 10A and 10B, the steering elements are an array of curved or "twisted" reflective surfaces, whose normal vector varies with position.

As a skilled person would appreciate, any one of a reflective, refractive and diffractive element often has analogous counterparts based on either or both of the other two elements to exert position-dependent directional influence. For instance, a concave (convex) mirror and a convex (concave) lens are reflective-refractive counterparts of a focussing (defocussing) element, with the former used in reflection mode and the latter used in transmission mode. As an example, in the arrangement of FIGS. 7A and 7B, the array of convex reflective surfaces may be replaced by an array of concave lenses as the steering elements. As another example already described above, the array of variable line-spacing gratings in the arrangements of FIGS. 9A and 9B may be replaced by the array of curved or "twisted" reflective surfaces of FIGS. 10A and 10B as the steering elements. Accordingly, the steering elements can be in the form of one or more of reflective, refractive or diffractive elements. Description of one type of element may be applicable to, with minor modifications, another type of element.

Now that arrangements of the present disclosure are described, it should be apparent to the skilled person in the art that at least one of the described arrangements have the following advantages:

The use of a wavelength-dependent beam director directs the outgoing light in a direction based on wavelength, with no or little inertia to improve the speed of beam re-direction.

Wavelength-tunability manifested in directional steering in one dimension can be translated to two dimensions using a number of analogous steering elements such as one or more of reflective, refractive and diffractive elements.

It will be understood that the disclosure disclosed and defined in this specification extends to all alternative combinations of two or more of the individual features mentioned or evident from the text or drawings. All of these different combinations constitute various alternative aspects of the disclosure. For example, there is provided disclosure according to the following statements:

i. An optical system for directing light over two dimensions, the light including a selected one of multiple wavelength channels grouped into wavelength bands, the system including:

a dispersive element arranged to direct the light over an initial dimension based on the selected one of the multiple wavelength channels; and an array of steering elements arranged along the initial dimension to receive the directed light, the steering elements arranged to further direct the received light towards respective planes based on the respective wavelength bands, each respective plane extending across a first dimension associated with the initial dimension, the respective planes distributed over a second dimension substantially perpendicular to the first dimension.

ii. The optical system of statement i. wherein the array of steering elements each include any one of a reflective element, a refractive and a diffractive element.

iii. The optical system of statement ii. wherein the array of reflective elements are arranged along the initial dimension to follow a concave path for equalising or aligning the extents of the first dimension across the respective planes.

iv. The optical system of statement iii. wherein the array of reflective elements are angularly offset from one another to reflect the received light towards the respective planes.

v. The optical system of statement i. wherein the dispersive element includes one or more gratings and one or more prisms for directing the light over the initial dimension.

vi. A method of directing light over two dimensions, the light including a selected one of multiple wavelength channels grouped into wavelength bands, the method including:
directing the light, using a dispersive element, over an initial dimension at an array of reflective elements arranged along the initial dimension based on the selected one of the multiple wavelength channels; and
reflecting the directed light, using the array of reflective elements, towards respective planes based on the respective wavelength bands, each respective plane extending across a first dimension associated with the initial dimension, the respective planes distributed over a second dimension substantially perpendicular to the first dimension.

vii. An optical system for directing light over two dimensions, the light including a selected one of multiple wavelength channels grouped into wavelength bands, the system including:
a first dispersive element arranged to direct the light towards one of first directions over an initial dimension based on the selected one of the multiple wavelength channels; and
an array of second dispersive elements arranged along the initial dimension to receive the directed light, the array of second dispersive elements configured to further direct the received light towards one of second directions, the second directions aligned along respective planes based on the respective wavelength bands, the planes being distributed over a first dimension associated with the initial dimension, each plane extending across a second dimension substantially perpendicular to the first dimension.

viii. The optical system of statement vii. wherein the array of second dispersive elements each include a variable line-spacing grating to diffract the received light across the second dimension.

ix. The optical system of statement viii. wherein the variable line-spacing grating includes multiple grating periods based on positions along the initial dimension on the variable line-spacing grating.

x. The optical system of statement ix. wherein the multiple grating periods vary continuously along the initial dimension.

xi. The optical system of statement x. wherein the multiple grating periods vary discretely along the initial dimension.

xii. The optical system of any one of statements ix.-xi. wherein variation in the multiple grating periods substantially repeats across the array of second dispersive elements.

xiii. The optical system of one of statements ix.-xii. wherein the second directions correspond to the positions along the initial dimension on the variable line-spacing grating.

xiv. The optical system of any one of statements ix.-xiii. further including a focussing element to confine the directed light received at the variable line-spacing grating in the initial dimension.

xv. The optical system of statement xiv. wherein the focussing element is a cylindrical lens.

xvi. The optical system of statement xiv. or xv further including a collimating element for collimating light focussed by the focussing element.

xvii. The optical system of statement vii. wherein the first dispersive element includes any combination of one or more gratings and one or more prisms for directing the light over the initial dimension.

xviii. A method of directing light over two dimensions, the light including a selected one of multiple wavelength channels grouped into wavelength bands, the method including:
directing the light, using a first dispersive element, towards one of first directions over an initial dimension at an array of second dispersive elements arranged along the initial dimension based on the selected one of the multiple wavelength channels; and
further directing the directed light, using the array of second dispersive elements, towards one of second directions, the second directions aligned along respective planes based on the respective wavelength bands, the planes being distributed over a first dimension associated with the initial dimension, each plane extending across a second dimension substantially perpendicular to the first dimension.

The invention claimed is:

1. An optical system for directing light over two dimensions, the optical system including:
a light source arranged to generate light comprising multiple wavelengths, including a first plurality of the multiple wavelengths, less than all of the multiple wavelengths, and a second plurality of the multiple wavelengths, less than all of the multiple wavelengths and different from the first plurality of the multiple wavelengths;
a controller configured to tune the light source to scan through the first plurality of the multiple wavelengths and the second plurality of the multiple wavelengths;
at least one dispersive element arranged to receive the first plurality of the multiple wavelengths and the second plurality of the multiple wavelengths and spatially disperse the received multiple wavelengths;
a first steering element arranged to receive, from the at least one dispersive element, the first plurality of the multiple wavelengths, and without mechanical movement spatially direct the first plurality of the multiple wavelengths across a first projection; and
a second steering element arranged to receive, from the at least one dispersive element, the second plurality of the multiple wavelengths, and without mechanical movement spatially direct the second plurality of the multiple wavelengths across a second projection;

wherein in combination the first projection and the second projection extend over two dimensions.

2. The optical system of claim 1, wherein the first projection and second projection are distributed over a first dimension and extend across a second dimension, transverse to the first dimension.

3. The optical system of claim 2, wherein the first projection and the second projection are substantially linear and substantially parallel.

4. The optical system of claim 2, wherein the first and second steering elements are dispersive elements located along the first dimension.

5. The optical system of claim 1, wherein the light source generates the first plurality of the multiple wavelengths and not the second plurality of the multiple wavelengths during a first time period and generates the second plurality of the multiple wavelengths and not the first plurality of the multiple wavelengths during a second time period, different from the first time period.

6. The optical system of claim 1, wherein the first steering element and the second steering element each include a variable line-spacing grating.

7. The optical system of claim 6 wherein the variable line-spacing grating includes different grating periods at different positions along the variable line-spacing grating.

8. The optical system of claim 7 wherein the multiple grating periods vary continuously.

9. The optical system of claim 7 wherein the multiple grating periods vary discretely.

10. The optical system of claim 7 wherein variation in the multiple grating periods substantially repeats across the array of steering elements.

11. The optical system of claim 1 wherein the at least one dispersive element includes one or more diffraction gratings and/or one or more prisms.

12. A method for directing light over two dimensions, the method including:

by a light source, producing a first light signal including a first range of wavelengths and a second light signal including a second range of wavelengths, including tuning the light source to scan through the first range of wavelengths and the second range of wavelengths;

receiving, at a first steering element, the first light signal including the first range of wavelengths distributed, by dispersion, across the first steering element and spatially directing, by the first steering element, the first light signal across a first projection;

receiving, at a second steering element, the second light signal including the second range of wavelengths distributed, by dispersion, across the second steering element, the second range of wavelengths different from the first range of wavelengths, and spatially directing, by the second steering element, the second light signal across a second projection;

wherein in combination the first projection and the second projection extend over two dimensions; and the first steering element and the second steering element comprise a diverging reflector or a dispersive element.

13. The method of claim 12, causing the dispersion by one or more diffraction gratings and/or one or more prisms.

14. The method of claim 12, wherein the first steering element and the second steering element each include a variable line-spacing grating to diffract the received light to effect said spatial directing.

* * * * *